US012739410B2

(12) United States Patent
Boyce

(10) Patent No.: US 12,739,410 B2
(45) Date of Patent: Sep. 15, 2026

(54) POINT CLOUD CODING STANDARD CONFORMANCE DEFINITION IN COMPUTING ENVIRONMENTS

(71) Applicant: Intel Corporation, Santa Clara, CA (US)

(72) Inventor: Jill Boyce, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 19/003,433

(22) Filed: Dec. 27, 2024

(65) Prior Publication Data

US 2026/0122258 A1 Apr. 30, 2026

Related U.S. Application Data

(63) Continuation of application No. 18/677,514, filed on May 29, 2024, now Pat. No. 12,219,158, which is a (Continued)

(51) Int. Cl.
*H04N 19/196* (2014.01)
*H04N 19/136* (2014.01)
(Continued)

(52) U.S. Cl.
CPC ......... *H04N 19/196* (2014.11); *H04N 19/136* (2014.11); *H04N 19/42* (2014.11); *H04N 19/463* (2014.11); *H04N 19/70* (2014.11)

(58) Field of Classification Search
None
See application file for complete search history.

(56) References Cited

U.S. PATENT DOCUMENTS 5,619,256 A 4/1997 Haskell et al.
5,768,122 A 6/1998 Motoc
(Continued)

FOREIGN PATENT DOCUMENTS

CN 110784703 A 2/2020
CN 110784714 A 2/2020
(Continued)

OTHER PUBLICATIONS

United States Patent and Trademark Office, "Final Rejection," issued in connection with U.S. Appl. No. 17/139,738, mailed on Apr. 21, 2023, 16 pages.
(Continued)

*Primary Examiner* — James M Anderson, II
(74) *Attorney, Agent, or Firm* — Hanley, Flight & Zimmerman, LLC

(57) ABSTRACT

A mechanism is described for facilitating defining of interoperability signaling and conformance points for the PCC standard in computing environments. A computing device of embodiments, as described herein, includes a decoder to decode a compressed bitstream of video data representing a point cloud, point cloud reconstructor circuitry to reconstruct a point cloud from the decoded patch video data, a syntax element parser to receive at least one syntax element representing interoperability signaling in the compressed bitstream to indicate the number of points in one or more pictures of the video data, and processing hardware to determine if the number of points in the one or more pictures of the compressed bitstream is within the conformance limits of the point cloud reconstructor circuitry.

20 Claims, 29 Drawing Sheets

Related U.S. Application Data continuation of application No. 18/466,590, filed on Sep. 13, 2023, now Pat. No. 12,063,378, which is a continuation of application No. 17/333,772, filed on May 28, 2021, now Pat. No. 11,800,121, which is a continuation of application No. 16/596,204, filed on Oct. 8, 2019, now Pat. No. 11,057,631.

(60) Provisional application No. 62/744,014, filed on Oct. 10, 2018.

(51) Int. Cl.
*H04N 19/42* (2014.01)
*H04N 19/463* (2014.01)
*H04N 19/70* (2014.01)

(56) References Cited

U.S. PATENT DOCUMENTS 5,781,194 A 7/1998 Ponomarev et al.
5,966,672 A 10/1999 Knupp
6,476,803 B1 11/2002 Zhang et al.
6,785,640 B1 8/2004 Lu et al.
7,003,136 B1 2/2006 Harville
7,831,087 B2 11/2010 Harville
8,106,924 B2 1/2012 Aliprandi
8,566,335 B1 10/2013 Wickland et al.
8,619,082 B1 12/2013 Ciurea et al.
9,053,547 B2 6/2015 Kitamura et al.
9,164,874 B1 10/2015 Tomay et al.
9,483,868 B1 11/2016 Tang
9,819,879 B2 11/2017 Kim et al.
9,852,351 B2 12/2017 Perez et al.
10,685,476 B2 6/2020 Kaufman et al.
10,762,394 B2 9/2020 Distler et al.
10,762,592 B2 9/2020 Xiao et al.
10,783,698 B2 9/2020 Mishaev et al.
10,819,968 B2 10/2020 Raziel et al.
10,839,589 B2 11/2020 Cilingir et al.
10,846,814 B2 11/2020 Boyce et al.
10,887,574 B2 1/2021 Ruhm et al.
10,893,299 B2 1/2021 Boyce et al.
10,909,761 B1 2/2021 Reid
10,911,799 B2 2/2021 Boyce et al.
10,922,832 B2 2/2021 Tanner et al.
11,049,266 B2 6/2021 Janus et al.
11,057,631 B2 7/2021 Boyce
11,151,424 B2 10/2021 Distler et al.
11,178,373 B2 11/2021 Varerkar et al.
11,212,506 B2 12/2021 Boyce
11,284,118 B2 3/2022 Boyce et al.
11,758,106 B2 9/2023 Boyce
11,800,121 B2 10/2023 Boyce
11,863,731 B2 1/2024 Ruhm et al.
12,063,378 B2 8/2024 Boyce
2003/0218606 A1 11/2003 Zhirkov et al.
2004/0027259 A1 2/2004 Soliman et al.
2007/0103464 A1 5/2007 Kaufman et al.
2007/0206008 A1 9/2007 Kaufman et al.
2008/0152191 A1 6/2008 Fujimura et al.
2009/0027391 A1 1/2009 Burley et al.
2009/0135191 A1 5/2009 Azar et al.
2009/0262206 A1 10/2009 Park
2010/0034457 A1 2/2010 Berliner et al.
2010/0195716 A1 8/2010 Gunnewiek et al.
2010/0231689 A1 9/2010 Bruls et al.
2010/0296750 A1 11/2010 Castelnuovo
2011/0202538 A1 8/2011 Salemann
2012/0004042 A1 1/2012 Perry
2012/0042209 A1 2/2012 Brock
2012/0044476 A1 2/2012 Earhart et al.
2012/0242796 A1 9/2012 Ciurea et al.
2012/0275702 A1 11/2012 Tuzel et al.
2012/0278439 A1 11/2012 Ahiska
2013/0089259 A1 4/2013 Cha et al.
2013/0089269 A1 4/2013 Cha et al.
2013/0127837 A1 5/2013 Hyodo et al.
2014/0267243 A1 9/2014 Venkataraman et al.
2014/0300775 A1 10/2014 Fan et al.
2014/0334541 A1 11/2014 Nakanishi et al.
2015/0016712 A1 1/2015 Rhoads et al.
2015/0070355 A1 3/2015 Clarberg
2015/0126282 A1 5/2015 Hitomi et al.
2015/0145966 A1 5/2015 Krieger et al.
2015/0154232 A1 6/2015 Ovsjanikov et al.
2015/0154467 A1 6/2015 Feng et al.
2015/0156473 A1 6/2015 Bennett et al.
2015/0201207 A1 7/2015 Yie
2015/0264404 A1 9/2015 Hannuksela
2015/0341663 A1 11/2015 Zhang et al.
2015/0371110 A1 12/2015 Hwang et al.
2016/0005234 A1 1/2016 Boivin et al.
2016/0035124 A1 2/2016 Sinha et al.
2016/0071325 A1 3/2016 Callaghan
2016/0104294 A1 4/2016 Gandolph et al.
2016/0109284 A1 4/2016 Hammershøi et al.
2016/0110910 A1 4/2016 Obert et al.
2016/0154999 A1 6/2016 Fan et al.
2016/0232703 A1 8/2016 Duan et al.
2016/0266256 A1 9/2016 Allen et al.
2016/0266266 A1 9/2016 Hu
2016/0299661 A1 10/2016 Alpert et al.
2017/0109611 A1 4/2017 Luo
2017/0150150 A1 5/2017 Thirumalai
2017/0177954 A1 6/2017 Micks et al.
2017/0184721 A1 6/2017 Sun et al.
2017/0244956 A1 8/2017 Stiglic et al.
2017/0310945 A1 10/2017 Juang et al.
2017/0331666 A1 11/2017 Walker
2017/0339391 A1 11/2017 Zhou et al.
2017/0339392 A1 11/2017 Forutanpour et al.
2017/0347120 A1* 11/2017 Chou .................... H04N 19/89
2017/0347122 A1 11/2017 Chou et al.
2017/0366812 A1 12/2017 Abbas et al.
2017/0374379 A1 12/2017 Chen et al.
2018/0007307 A1 1/2018 Walker
2018/0035134 A1 2/2018 Pang et al.
2018/0075320 A1 3/2018 Zermas et al.
2018/0075635 A1 3/2018 Choi et al.
2018/0075636 A1 3/2018 Harvill
2018/0108151 A1 4/2018 Hemmer et al.
2018/0117897 A1 5/2018 Zeng et al.
2018/0124419 A1 5/2018 He
2018/0144458 A1 5/2018 Xu et al.
2018/0150994 A1 5/2018 Foutzitzis et al.
2018/0184000 A1 6/2018 Lee et al.
2018/0189647 A1 7/2018 Calvo et al.
2018/0225515 A1 8/2018 Jiang et al.
2018/0232583 A1 8/2018 Wang et al.
2018/0268570 A1 9/2018 Budagavi et al.
2018/0300937 A1 10/2018 Chien et al.
2018/0352207 A1 12/2018 Kern et al.
2018/0373326 A1 12/2018 Gatson et al.
2019/0007679 A1 1/2019 Coban et al.
2019/0104324 A1 4/2019 Han et al.
2019/0108611 A1 4/2019 Izumi
2019/0122393 A1 4/2019 Sinharoy et al.
2019/0156520 A1 5/2019 Mammou et al.
2019/0159868 A1 5/2019 Chen et al.
2019/0197739 A1 6/2019 Sinharoy et al.
2019/0206059 A1 7/2019 Landman
2019/0215532 A1 7/2019 He
2019/0251673 A1 8/2019 Kim et al.
2019/0260989 A1 8/2019 Fabien
2019/0308099 A1 10/2019 Lalonde et al.
2019/0313199 A1 10/2019 Laaksonen et al.
2019/0321727 A1 10/2019 Rodgers et al.
2019/0325614 A1 10/2019 Krishnaprasad et al.
2019/0373326 A1 12/2019 Han
2020/0020132 A1* 1/2020 Sinharoy ................ H03M 7/70
2020/0021847 A1 1/2020 Kim et al.
2020/0042834 A1 2/2020 Distler et al.
2020/0043121 A1 2/2020 Boyce et al.
2020/0043122 A1 2/2020 Xiao et al.

(56) References Cited

U.S. PATENT DOCUMENTS

| | | | |
|---|---|---|---|
| 2020/0043182 | A1 | 2/2020 | Janus et al. |
| 2020/0043190 | A1 | 2/2020 | Tanner et al. |
| 2020/0043217 | A1 | 2/2020 | Cilingir et al. |
| 2020/0043220 | A1 | 2/2020 | Mishaev et al. |
| 2020/0043221 | A1 | 2/2020 | Kaufman et al. |
| 2020/0045285 | A1 | 2/2020 | Varerkar et al. |
| 2020/0045288 | A1 | 2/2020 | Boyce |
| 2020/0045289 | A1 | 2/2020 | Raziel et al. |
| 2020/0045290 | A1 | 2/2020 | Ruhm et al. |
| 2020/0045292 | A1 | 2/2020 | Boyce |
| 2020/0045343 | A1 | 2/2020 | Boyce et al. |
| 2020/0045344 | A1 | 2/2020 | Boyce et al. |
| 2020/0045348 | A1 | 2/2020 | Boyce et al. |
| 2020/0059668 | A1 | 2/2020 | Ikonin |
| 2020/0120347 | A1 | 4/2020 | Boyce |
| 2020/0134857 | A1 | 4/2020 | Khatoonabadi et al. |
| 2020/0169716 | A1 | 5/2020 | Horvitz et al. |
| 2020/0230499 | A1 | 7/2020 | Buser et al. |
| 2020/0238175 | A1 | 7/2020 | Smullen et al. |
| 2020/0258262 | A1 | 8/2020 | Lasserre |
| 2020/0267753 | A1 | 8/2020 | Adjakple |
| 2020/0327266 | A1 | 10/2020 | Yim et al. |
| 2020/0364514 | A1 | 11/2020 | Distler et al. |
| 2020/0389469 | A1 | 12/2020 | Litichever |
| 2021/0001216 | A1 | 1/2021 | Sanders et al. |
| 2021/0083967 | A1 | 3/2021 | Joshi |
| 2021/0112281 | A1* | 4/2021 | Wang ...................... H04L 65/70 |
| 2021/0245046 | A1 | 8/2021 | Dharmapurikar et al. |
| 2021/0250617 | A1 | 8/2021 | Hannuksela |
| 2021/0258616 | A1 | 8/2021 | Boyce et al. |
| 2021/0266515 | A1 | 8/2021 | Ruhm et al. |
| 2021/0339130 | A1 | 11/2021 | Sameer Kalathil |
| 2022/0010167 | A1 | 1/2022 | Michaelis et al. |
| 2022/0040573 | A1 | 2/2022 | Fear |
| 2022/0101067 | A1 | 3/2022 | Distler et al. |
| 2022/0224776 | A1 | 7/2022 | Doshi et al. |
| 2022/0256647 | A1 | 8/2022 | Salmasi et al. |

FOREIGN PATENT DOCUMENTS

| | | | |
|---|---|---|---|
| CN | 110784720 | A | 2/2020 |
| CN | 110784738 | A | 2/2020 |
| CN | 110784765 | A | 2/2020 |
| CN | 110796589 | A | 2/2020 |
| CN | 110796720 | A | 2/2020 |
| CN | 110796724 | A | 2/2020 |
| CN | 110853125 | A | 2/2020 |
| CN | 113253979 | A | 8/2021 |
| DE | 102019114970 | A1 | 2/2020 |
| DE | 102019117485 | A1 | 2/2020 |
| DE | 102019117495 | A1 | 2/2020 |
| DE | 102019117514 | A1 | 2/2020 |
| DE | 102019117585 | A1 | 2/2020 |
| DE | 102019117592 | A1 | 2/2020 |
| DE | 102019119058 | A1 | 2/2020 |
| DE | 102019119085 | A1 | 2/2020 |
| DE | 102019127349 | A1 | 4/2020 |
| EP | 3301931 | A1 | 4/2018 |
| EP | 3862060 | A1 | 8/2021 |
| GB | 2553892 | A | 3/2018 |
| GB | 2553892 | B | 6/2019 |
| WO | 2018009746 | A1 | 1/2018 |
| WO | 2019079093 | A1 | 4/2019 |

OTHER PUBLICATIONS

United States Patent and Trademark Office, "Notice of Allowance and Fee(s) Due," issued in connection with U.S. Appl. No. 17/562,062, mailed on May 5, 2023, 15 pages.

United States Patent and Trademark Office, "Notice of Allowance and Fee(s) Due," issued in connection with U.S. Appl. No. 17/333,772, mailed on Jun. 22, 2023, 7 pages.

United States Patent and Trademark Office, "Non-Final Rejection," issued in connection with U.S. Appl. No. 17/168,388, mailed on Jul. 3, 2023, 7 pages.

United States Patent and Trademark Office, "Non-Final Rejection," issued in connection with U.S. Appl. No. 17/168,299, mailed on Aug. 22, 2023, 7 pages.

United States Patent and Trademark Office, "Notice of Allowance and Fee(s) Due," issued in connection with U.S. Appl. No. 18/466,590, mailed on Apr. 5, 2024, 9 pages.

United States Patent and Trademark Office, "Notice of Allowance and Fee(s) Due," issued in connection with U.S. Appl. No. 18/677,514, mailed on Sep. 25, 2024, 8 pages.

United States Patent and Trademark Office, "Corrected Notice of Allowance and Fee(s) Due," issued in connection with U.S. Appl. No. 18/677,514, dated Nov. 21, 2024, 6 pages.

Telesford et al., "The Ubiquity of Small-World Networks," Brain Connectivity, vol. 1, Issue 5, Sep. 2011, 9 pages.

Porter, "Small-World Network," Scholarpedia, retrieved from https://web.archive.org/web/20120320234139/ on Oct. 24, 2019, archived from the original http://scholarpedia.org/article/Small-world_network on Mar. 20, 2012, 8 pages.

Achanta et al., "SLIC Superpixels Compared to State-of-the-Art Superpixel Methods," IEEE Transactions on Pattern Analysis and Machine Intelligence, vol. 34, No. 11, Nov. 2012, 8 pages.

Papon et al., "Voxel Cloud Connectivity Segmentation—Supervoxels for Point Clouds," Proceedings of the IEEE Conference on Computer Vision and Pattern Recognition, Jun. 23-28, 2013, 8 pages. doi.org/10.1109/CVPR.2013.264.

Sell et al., "The Xbox One System on a Chip and Kinect Sensor," IEEE Micro, vol. 34, Issue 2, 2014, 10 pages. doi.org/10.1109/MM.2014.9.

Wikipedia, "Cloud gaming-Wikipedia, the free encyclopedia," Aug. 16, 2015, XP055308747, 8 pages.

Thanou et al., "Graph-based Compression of Dynamic 3D Point Cloud Sequences," IEEE Transactions on Image Processing, vol. 25, Issue 4, Apr. 2016, 14 pages. doi.org/10.1109/TIP.2016.2529506.

Nan et al., "Delay-rate-distortion optimization for cloud-baed collaborative rendering," IEEE 18th International Workshop on Multimedia Signal Processing, Sep. 21, 2016, 6 pages. doi.org/10.1109/MMSP.2016.7813405.

Xiaoming et al., "Delay-rate-distortion optimization for cloud-based collaborative rendering," IEEE 18th International Workshop on Multimedia Signal Processing, Sep. 21, 2016, 6 pages.

International Organization for Standardization Press Release N16738, "MPEG starts work onthe MPEG-I new work item targeting future immersive applications," Apr. 7, 2017, 4 pages.

Wang et al., "Point-Cloud Compression Using Data Independent Method—A 3D Discrete Cosine Transform Approach," IEEE International Conference on Information and Automation, Jul. 18-20, 2017, 6 pages.

Schwarz et al., "Nokia's Response to CfP for Point Cloud Compression (Category 2)," ISO/IEC JTC1/SC29/WG11 M41779, Oct. 2017, 22 pages.

Mammou et al., "Point Cloud Compression: Test Model Category 2 version 0.0," International Organization for Standardization ISO/IEC JTC/SC29/WG11, Oct. 2017, 7 pages.

Mammou, "PCC Test Model Category 2 v1 ," ISO/IEC JTC1/SC29/WG11 N17348, Jan. 2018, 11 pages.

Mammou et al., "Working draft of Point Cloud Coding for Category 2 (Draft 1)," ISO/IEC JTC1/SC29/WG11 N17534, Apr. 2018, 34 pages.

United States Patent and Trademark Office, "Non-Final Rejection," issued in connection with U.S. Appl. No. 16/050,153, mailed on Aug. 21, 2019, 14 pages.

United States Patent and Trademark Office, "Non-Final Rejection," issued in connection with U.S. Appl. No. 16/050,277, mailed on Sep. 6, 2019, 14 pages.

United States Patent and Trademark Office, "Non-Final Rejection," issued in connection with U.S. Appl. No. 16/050,322, mailed on Dec. 9, 2019, 12 pages.

German Patent Office, "Notice of Publication," issued in connection with German Patent Application No. 102019117593.5, mailed on Feb. 6, 2020, 73 pages.

(56) References Cited

OTHER PUBLICATIONS

Chinese Patent Office, "Notice of Publication," issued in connection with Chinese Patent Application No. 201910575114.1, mailed on Feb. 11, 2020, 71 pages.
Chinese Patent Office, "Notice of Publication," issued in connection with Chinese Patent Application No. 201910575159.9, issued on Feb. 11, 2020, 76 pages.
German Patent Office, "Notice of Publication," issued in connection with German Parent Application No. 102019120554.9, mailed on Feb. 20, 2020, 67 pages.
United States Patent and Trademark Office, "Final Rejection," issued in connection with U.S. Appl. No. 16/050,277, mailed on Mar. 5, 2020, 17 pages.
United States Patent and Trademark Office, "Final Rejection," issued in connection with U.S. Appl. No. 16/050,153, mailed on Mar. 6, 2020, 17 pages.
Chinese Patent Office, "Notice of Publication," issued in connection with Chinese Patent Application No. 201910553919.6, mailed on Mar. 9, 2020, 5 pages.
Chinese Patent Office, "Notice of Publication," issued in connection with Chinese Patent Application No. 201910553782.4, mailed on Mar. 9, 2020, 5 pages.
Chinese Patent Office, "Notice of Publication," issued in connection with Chinese Patent Application No. 201910567293.4, mailed on Mar. 12, 2020, 69 pages.
German Patent Office, "Notice of Publication," issued in connection with German Patent Application No. 102019117218.7, mailed on Mar. 15, 2020, 67 pages.
German Patent Office, "Notice of Publication," issued in connection with German Patent Application No. 102019117469.4, mailed on Mar. 15, 2020, 71 pages.
United States Patent and Trademark Office, "Final Rejection," issued in connection with U.S. Appl. No. 16/050,322, mailed on Jul. 29, 2020, 11 pages.
United States Patent and Trademark Office, "Notice of Allowance and Fee(s) Due," issued in connection with U.S. Appl. No. 16/050,277, mailed on Sep. 2, 2020, 10 pages.
United States Patent and Trademark Office, "Non-Final Rejection," issued in connection with U.S. Appl. No. 16/050,153, mailed on Sep. 2, 2020, 16 pages.
United States Patent and Trademark Office, "Notice of Allowance and Fee(s) Due," issued in connection with U.S. Appl. No. 16/050,391, mailed on Sep. 11, 2020, 8 pages.
United States Patent and Trademark Office, "Requirement for Restriction / Election," issued in connection with U.S. Appl. No. 16/596,204, dated Oct. 8, 2020, 5 pages.
United States Patent and Trademark Office, "Final Rejection," issued in connection with U.S. Appl. No. 16/050,153, mailed on Jan. 29, 2021, 20 pages.
United States Patent and Trademark Office, "Notice of Allowance and Fee(s) Due," issued in connection with U.S. Appl. No. 16/050,322, mailed on Feb. 18, 2021, 5 pages.
United States Patent and Trademark Office, "Notice of Allowance and Fee(s) Due," issued in connection with U.S. Appl. No. 16/596,204, dated Mar. 10, 2021, 8 pages.
United States Patent and Trademark Office, "Notice of Allowance and Fee(s) Due," issued in connection with U.S. Appl. No. 16/987,026, mailed on Jun. 28, 2021, 9 pages.
European Patent Office, "Extended European Search Report," issued in connection with European Patent Application No. 21156239.2, mailed on Jun. 30, 2021, 9 pages.
United States Patent and Trademark Office, "Notice of Allowance and Fee(s) Due," issued in connection with U.S. Appl. No. 16/050,322, mailed on Jul. 12, 2021, 9 pages.
United States Patent and Trademark Office, "Non-Final Rejection," issued in connection with U.S. Appl. No. 16/050,509, mailed on Jul. 21, 2021, 15 pages.
Chinese Patent Office, "Notice of Publication," issued in connection with Chinese Patent Application No. 202110184672.2, mailed on Aug. 19, 2021, 4 pages.
United States Patent and Trademark Office, "Notice of Allowance and Fee(s) Due," issued in connection with U.S. Appl. No. 16/050,153, mailed on Aug. 25, 2021, 10 pages.
United States Patent and Trademark Office, "Notice of Allowance and Fee(s) Due," issued in connection with U.S. Appl. No. 17/111,677, mailed on Nov. 26, 2021, 8 pages.
United States Patent and Trademark Office, "Non-Final Rejection," issued in connection with U.S. Appl. No. 16/050,509, mailed on Apr. 28, 2022, 17 pages.
United States Patent and Trademark Office, "Final Rejection," issued in connection with U.S. Appl. No. 16/050,509, mailed on Aug. 17, 2022, 16 pages.
United States Patent and Trademark Office, "Notice of Allowance and Fee(s) Due," issued in connection with 17/494,192, mailed on Oct. 3, 2022, 12 pages.
United States Patent and Trademark Office, "Non-Final Rejection," issued in connection with U.S. Appl. No. 17/526,633, mailed on Oct. 24, 2022, 11 pages.
United States Patent and Trademark Office, "Non-Final Rejection," issued in connection with U.S. Appl. No. 17/139,738, mailed on Dec. 27, 2022, 13 pages.
United States Patent and Trademark Office, "Final Rejection," issued in connection with U.S. Appl. No. 17/526,633, mailed on Feb. 13, 2023, 7 pages.

* cited by examiner

GRAPHICS PROCESSOR COMMAND FORMAT
900

| CLIENT 902 | OPCODE 904 | SUB-OPCODE 905 | DATA 906 | COMMAND SIZE 908 |
| --- | --- | --- | --- | --- |

GRAPHICS PROCESSOR COMMAND SEQUENCE
910

Figure 11A:
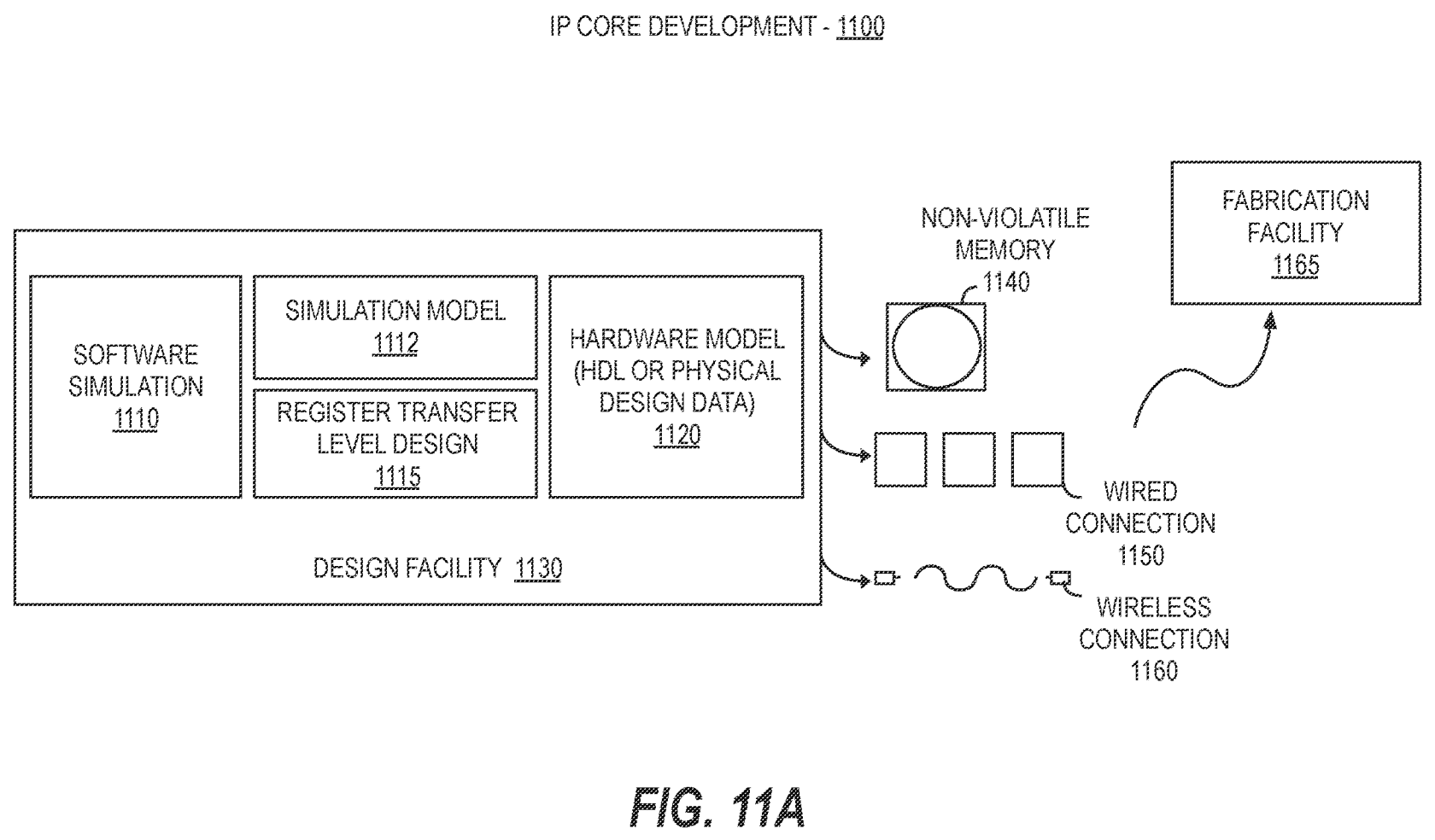

IP CORE DEVELOPMENT - 1100

SOFTWARE SIMULATION 1110

SIMULATION MODEL 1112

REGISTER TRANSFER LEVEL DESIGN 1115

HARDWARE MODEL (HDL OR PHYSICAL DESIGN DATA) 1120

DESIGN FACILITY 1130

NON-VIOLATILE MEMORY 1140

WIRED CONNECTION 1150

WIRELESS CONNECTION 1160

FABRICATION FACILITY 1165

Figure 21:
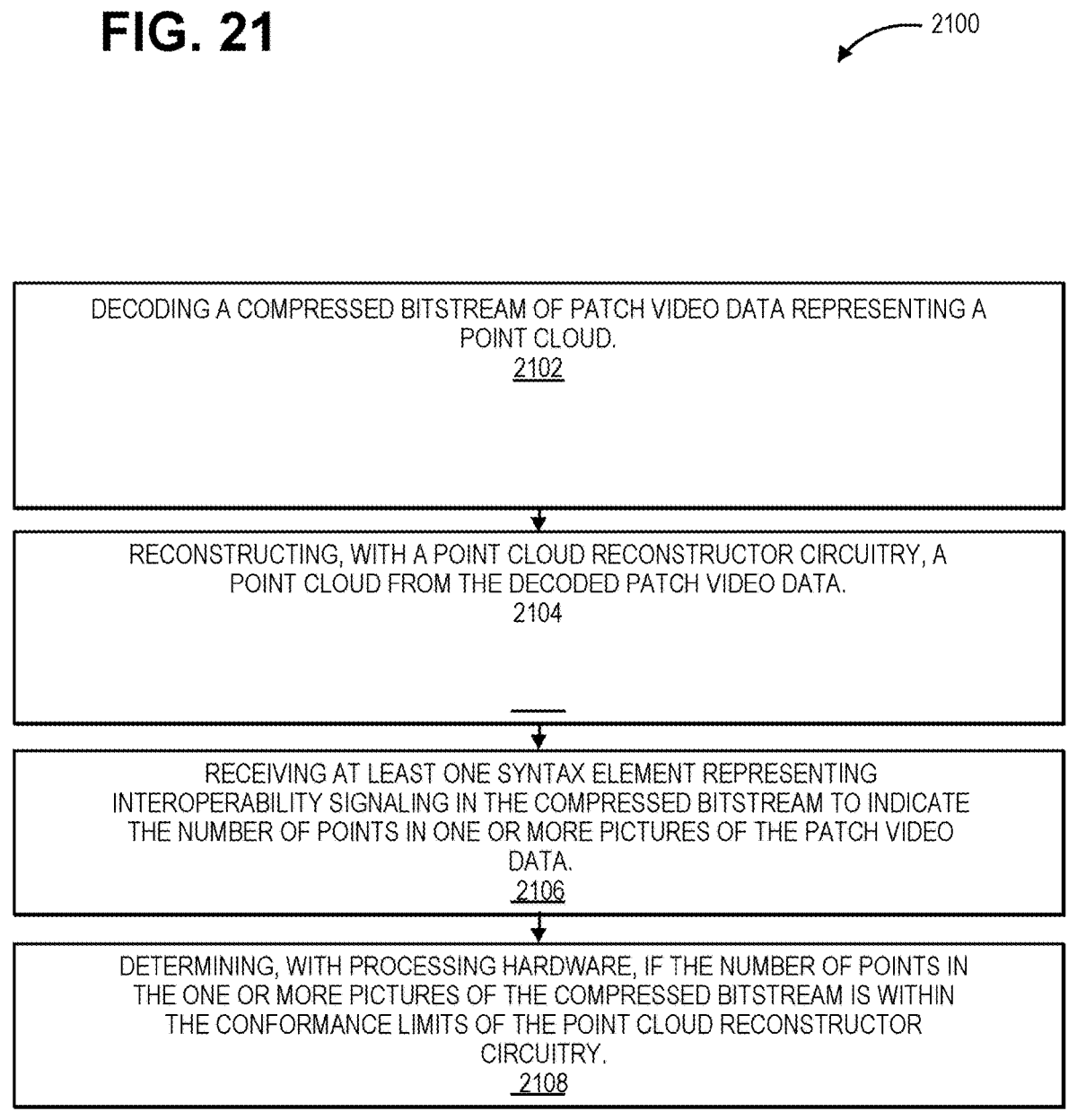

DECODING A COMPRESSED BITSTREAM OF PATCH VIDEO DATA REPRESENTING A POINT CLOUD.
2102

RECONSTRUCTING, WITH A POINT CLOUD RECONSTRUCTOR CIRCUITRY, A POINT CLOUD FROM THE DECODED PATCH VIDEO DATA.
2104

RECEIVING AT LEAST ONE SYNTAX ELEMENT REPRESENTING INTEROPERABILITY SIGNALING IN THE COMPRESSED BITSTREAM TO INDICATE THE NUMBER OF POINTS IN ONE OR MORE PICTURES OF THE PATCH VIDEO DATA.
2106

DETERMINING, WITH PROCESSING HARDWARE, IF THE NUMBER OF POINTS IN THE ONE OR MORE PICTURES OF THE COMPRESSED BITSTREAM IS WITHIN THE CONFORMANCE LIMITS OF THE POINT CLOUD RECONSTRUCTOR CIRCUITRY.
2108

POINT CLOUD CODING STANDARD CONFORMANCE DEFINITION IN COMPUTING ENVIRONMENTS

RELATED APPLICATIONS

This patent arises from a continuation of U.S. patent application Ser. No. 18/677,514, filed May 29, 2024, which is a continuation of U.S. patent application Ser. No. 18/466,590, filed Sep. 13, 2023, which is a continuation of U.S. patent application Ser. No. 17/333,772, filed May 28, 2021, which is a continuation of U.S. application Ser. No. 16/596,204, filed Oct. 8, 2019, which claims priority from U.S. Provisional Application No. 62/744,014, filed Oct. 10, 2018. U.S. patent application Ser. No. 18/677,514, U.S. patent application Ser. No. 18/466,590, U.S. Ser. No. 17/333,772, U.S. application Ser. No. 16/596,204, and U.S. Provisional Application No. 62/744,014 are incorporated herein by reference in their respective entireties.

FIELD

Embodiments described herein generally relate to computers. More particularly, embodiments are described for facilitating defining interoperability signaling and conformance points for the Point Cloud Coding standard in computing environments.

BACKGROUND

Conventionally, there has not been a definition as to how the Point Cloud Coding (PCC) draft standard should define interoperability signaling and conformance points.

BRIEF DESCRIPTION OF THE DRAWINGS

Embodiments are illustrated by way of example, and not by way of limitation, in the figures of the accompanying drawings in which like reference numerals refer to similar elements.

FIG. 11A is a block diagram illustrating an IP core development system that may be used to manufacture an integrated circuit to perform operations according to an embodiment.

Figure 20:
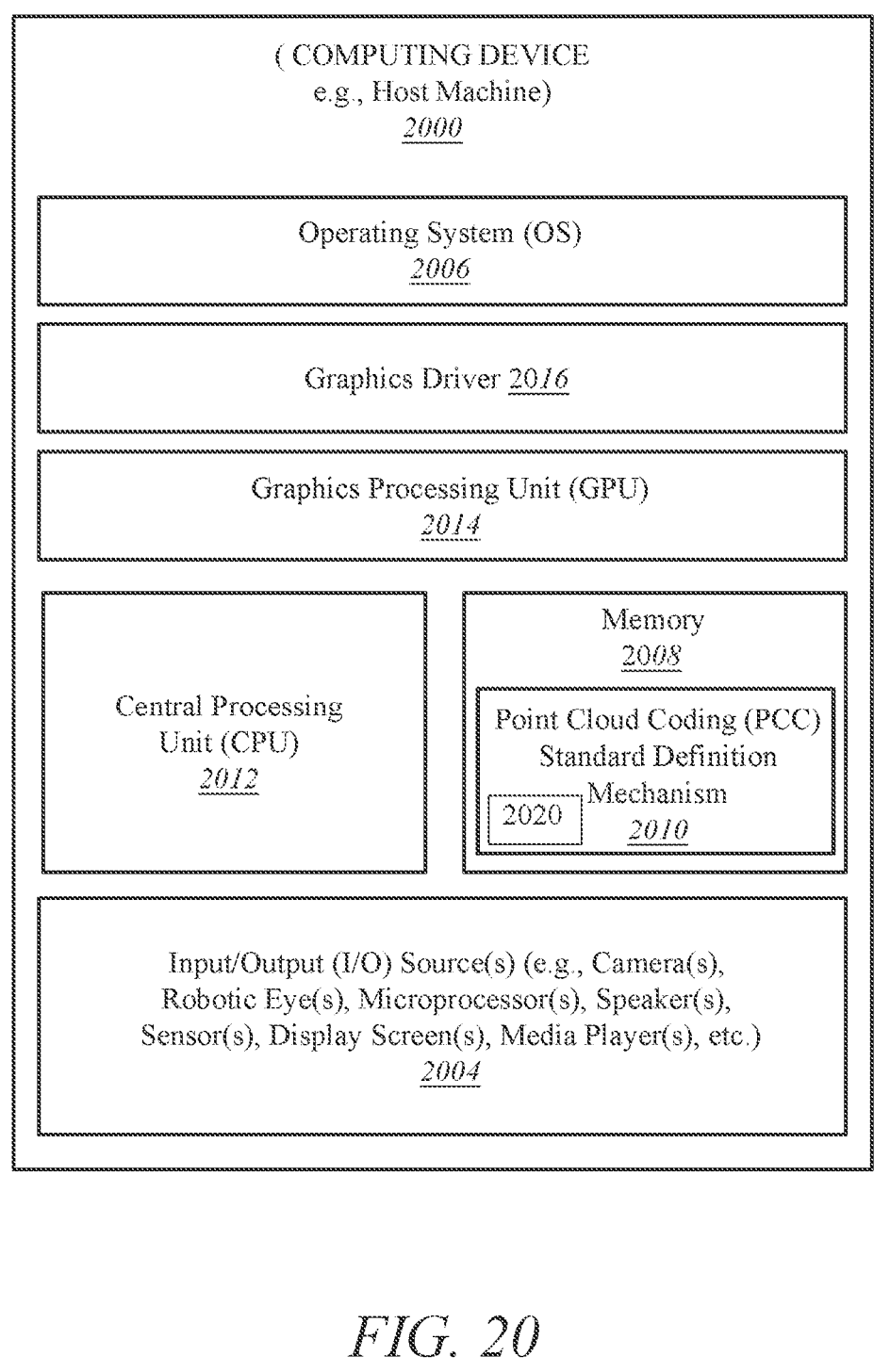

FIG. 20 illustrates a computing device hosting an extended monochrome bit-depth coding mechanism according to one embodiment.

FIG. 21 illustrates a computer implemented method 2100 having an exemplary sequence of operations for a PCC standard definition mechanism in accordance with one embodiment.

DETAILED DESCRIPTION

In the following description, numerous specific details are set forth. However, embodiments, as described herein, may be practiced without these specific details. In other instances, well-known circuits, structures and techniques have not been shown in detail in order not to obscure the understanding of this description.

Embodiments provide for a novel technique for defining interoperability signaling and conformance points to enable ecosystem specification of PCC products, which allows for flexible video decode and graphics processing unit (GPU) capability.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), Open Computing Language (OpenCL®), CUDA®, DirectX® 11, DirectX® 12, etc., where "dispatch" may be interchangeably referred to as "work unit" or "draw" and similarly, "application" may be interchangeably referred to as "workflow" or simply "agent". For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

System Overview

Figure 1:
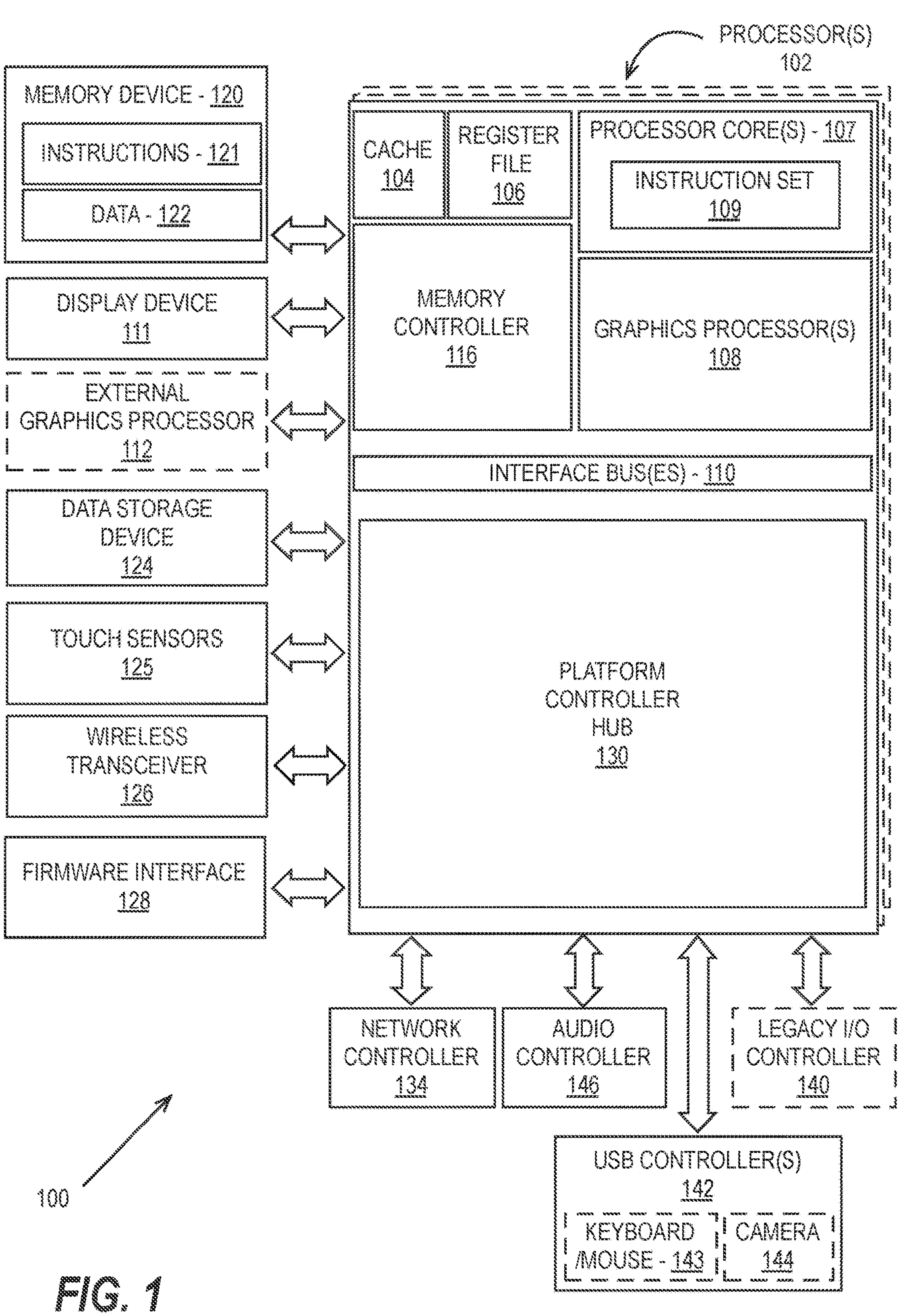
FIG. 1 is a block diagram of a processing system, according to an embodiment.

FIG. 1 is a block diagram of a processing system 100, according to an embodiment. In various embodiments, the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

In one embodiment, the system 100 can include, or be incorporated within a server-based gaming platform, a game console, including a game and media console, a mobile gaming console, a handheld game console, or an online game console. In some embodiments, the system 100 is a mobile phone, smart phone, tablet computing device or mobile Internet device. The processing system 100 can also include, couple with, or be integrated within a wearable device, such as a smart watch wearable device, smart eyewear device, augmented reality device, or virtual reality device. In some embodiments, the processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment, the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random-access memory (DRAM) device, a static random-access memory (SRAM) device, flash memory device, phase-change memory device, or some other memory device having suitable performance to serve as process memory. In one embodiment, the memory device 120 can operate as system memory for the system 100, to store data 122 and instructions 121 for use when the one or more processors 102 executes an application or process. Memory controller 116 also couples with an optional external graphics processor 112, which may communicate with the one or more graphics processors 108 in processors 102 to perform graphics and media operations. In some embodiments, a display device 111 can connect to the processor(s) 102. The display device 111 can be one or more of an internal display device, as in a mobile electronic device or a laptop device or an external display device attached via a display interface (e.g., DisplayPort, etc.). In one embodiment, the display device 111 can be a head mounted display (HMD) such as a stereoscopic display device for use in virtual reality (VR) applications or augmented reality (AR) applications.

In some embodiments, the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., hard disk drive, flash memory, etc.). The data storage device 124 can connect via a storage interface (e.g., SATA) or via a peripheral bus, such as a Peripheral Component Interconnect bus (e.g., PCI, PCI Express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, or Long Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment, the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and platform controller hub 130 may be integrated into a discreet external graphics processor, such as the external graphics processor 112. In one embodiment, the platform controller hub 130 and/or memory controller 116 may be external to the one or more processor(s) 102. For example, the system 100 can include an external memory controller 116 and platform controller hub 130, which may be configured as a memory controller hub and peripheral controller hub within a system chipset that is in communication with the processor(s) 102.

Figure 2:
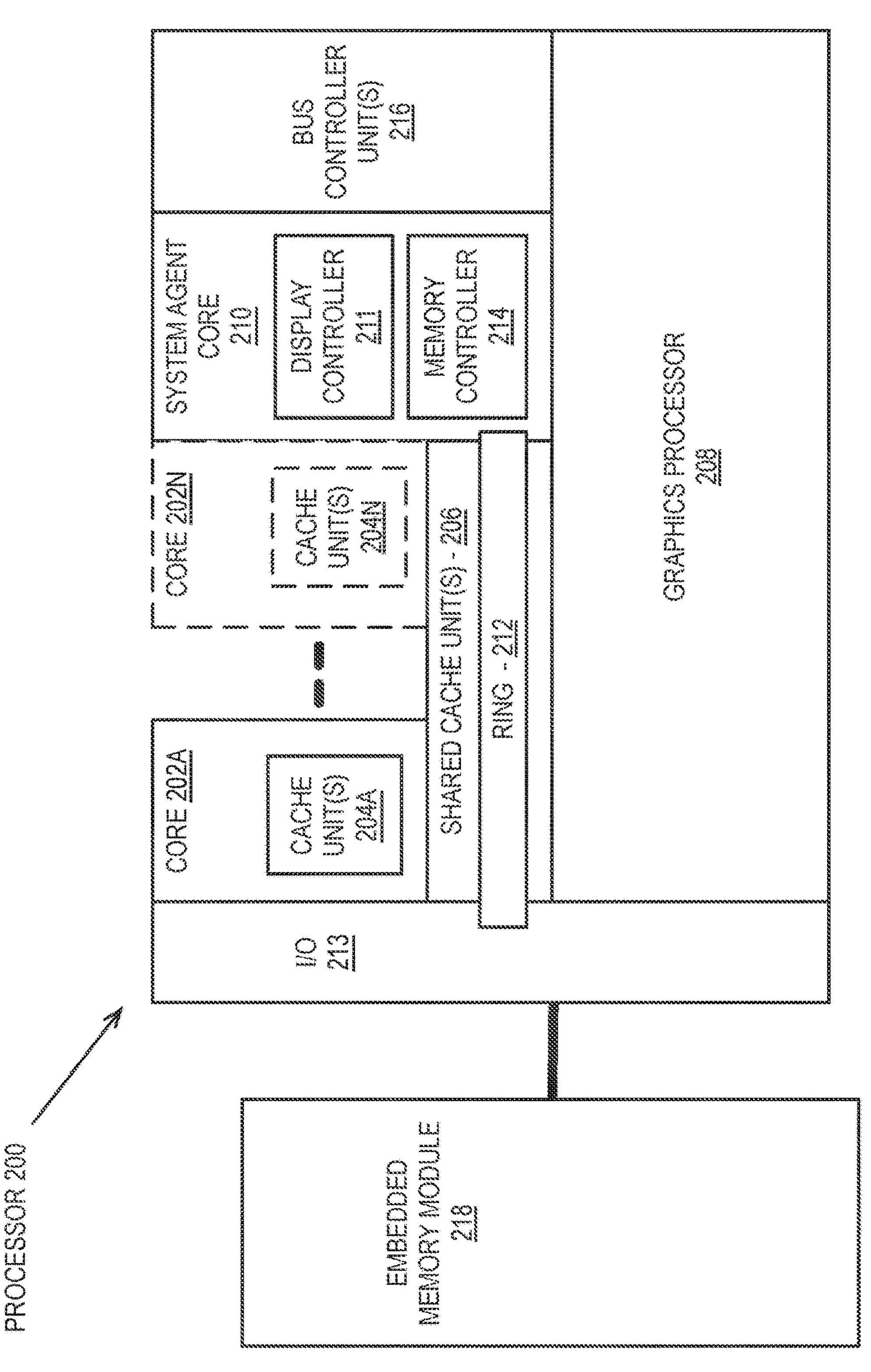
FIG. 2 is a block diagram of an embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments, each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
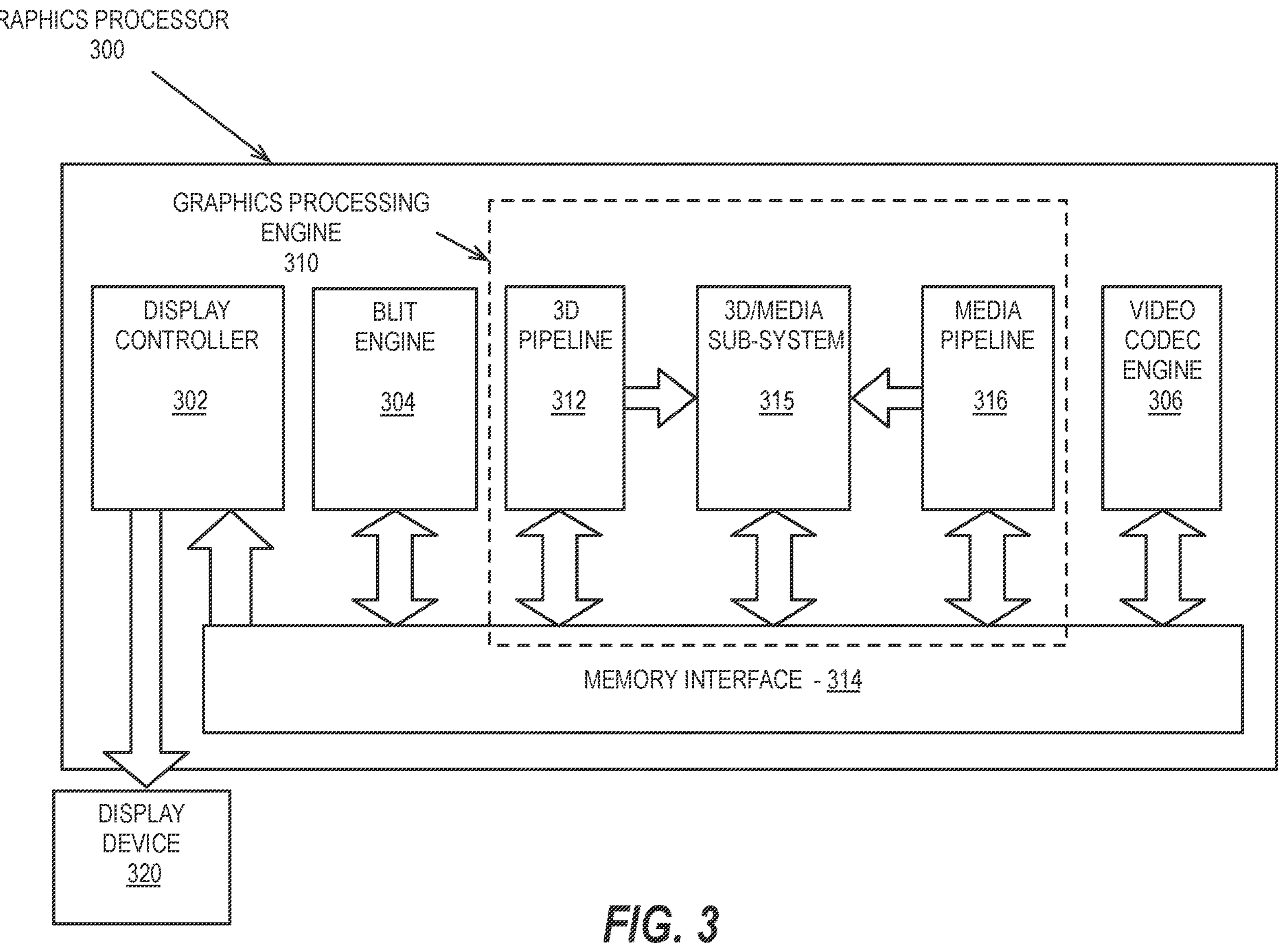
FIG. 3 is a block diagram of a graphics processor, which may be a discrete graphics processing unit, or may be a graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. The display device 320 can be an internal or external display device. In one embodiment, the display device 320 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
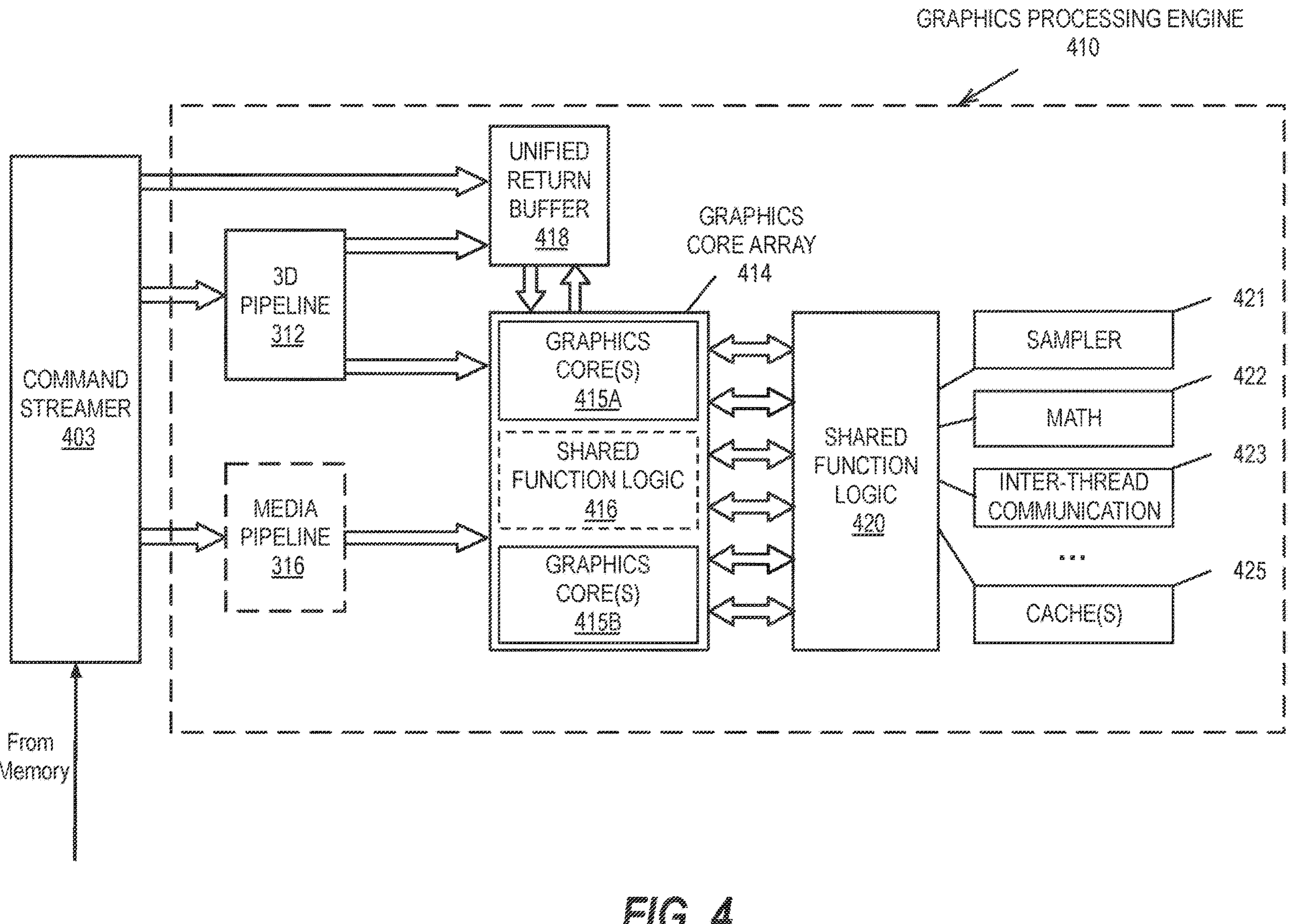
FIG. 4 is a block diagram of a graphics processing engine of a graphics processor in accordance with some embodiments.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example, and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment, the graphics core array 414 include one or more blocks of graphics cores (e.g., graphics core(s) 415A, graphics core(s) 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments, the 3D pipeline 312 includes fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphic core array 414 includes support for various 3D API shader languages and can execute multiple simultaneous execution threads associated with multiple shaders.

In some embodiments, the graphics core array 414 also includes execution logic to perform media functions, such as video and/or image processing. In one embodiment, the execution units additionally include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments, the URB 418 may be used to send data between different threads executing on the graphics core array 414. In some embodiments, the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment, the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment, the shared function logic 420 is excluded in favor of the shared function logic 416 within the graphics core array 414.

Figure 5:
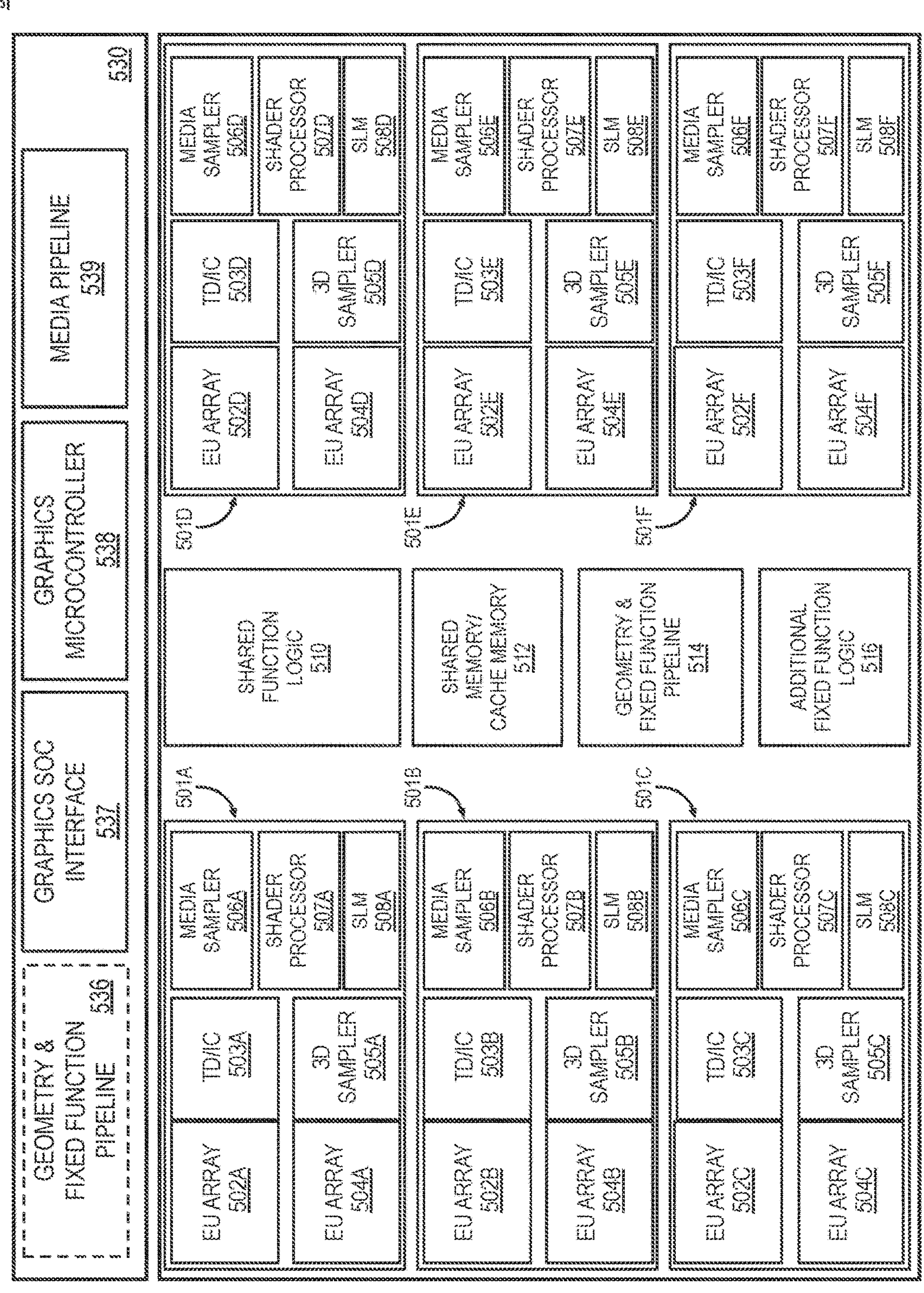
FIG. 5 is a block diagram of hardware logic of a graphics processor core according to some embodiments.

FIG. 5 is a block diagram of hardware logic of a graphics processor core 500, according to some embodiments described herein. Elements of FIG. 5 having the same reference numbers (or names) as the elements of any other figure herein can operate or function in any manner similar to that described elsewhere herein, but are not limited to such. The illustrated graphics processor core 500, in some embodiments, is included within the graphics core array 414 of FIG. 4. The graphics processor core 500, sometimes referred to as a core slice, can be one or multiple graphics cores within a modular graphics processor. The graphics processor core 500 is exemplary of one graphics core slice, and a graphics processor as described herein may include multiple graphics core slices based on target power and performance envelopes. Each graphics processor core 500 can include a fixed function block 530 coupled with multiple sub-cores 501A-501F, also referred to as sub-slices, that include modular blocks of general-purpose and fixed function logic.

In some embodiments, the fixed function block 530 includes a geometry/fixed function pipeline 536 that can be shared by all sub-cores in the graphics processor core 500, for example, in lower performance and/or lower power graphics processor implementations. In various embodiments, the geometry/fixed function pipeline 536 includes a 3D fixed function pipeline (e.g., 3D pipeline 312 as in FIG. 3 and FIG. 4) a video front-end unit, a thread spawner and thread dispatcher, and a unified return buffer manager, which manages unified return buffers, such as the unified return buffer 418 of FIG. 4.

In one embodiment, the fixed function block 530 also includes a graphics SoC interface 537, a graphics microcontroller 538, and a media pipeline 539. The graphics SoC interface 537 provides an interface between the graphics processor core 500 and other processor cores within a system on a chip integrated circuit. The graphics microcontroller 538 is a programmable sub-processor that is configurable to manage various functions of the graphics processor core 500, including thread dispatch, scheduling, and pre-emption. The media pipeline 539 (e.g., media pipeline 316 of FIG. 3 and FIG. 4) includes logic to facilitate the decoding, encoding, pre-processing, and/or post-processing of multimedia data, including image and video data. The media pipeline 539 implement media operations via requests to compute or sampling logic within the sub-cores 501-501F.

In one embodiment, the SoC interface 537 enables the graphics processor core 500 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 537 can also enable communication with fixed function devices within the SoC, such as camera imaging pipelines, and enables the use of and/or implements global memory atomics that may be shared between the graphics processor core 500 and CPUs within the SoC. The SoC interface 537 can also implement power management controls for the graphics processor core 500 and enable an interface between a clock domain of the graphic processor core 500 and other clock domains within the SoC. In one embodiment, the SoC interface 537 enables receipt of command buffers from a command streamer and global thread dispatcher that are configured to provide commands and instructions to each of one or more graphics cores within a graphics processor. The commands and instructions can be dispatched to the media pipeline 539, when media operations are to be performed, or a geometry and fixed function pipeline (e.g., geometry and fixed function pipeline 536, geometry and fixed function pipeline 514) when graphics processing operations are to be performed.

The graphics microcontroller 538 can be configured to perform various scheduling and management tasks for the graphics processor core 500. In one embodiment, the graphics microcontroller 538 can perform graphics and/or compute workload scheduling on the various graphics parallel engines within execution unit (EU) arrays 502A-502F, 504A-504F within the sub-cores 501A-501F. In this scheduling model, host software executing on a CPU core of an SoC including the graphics processor core 500 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment, the graphics microcontroller 538 can also facilitate low-power or idle states for the graphics processor core 500, providing the graphics processor core 500 with the ability to save and restore registers within the graphics processor core 500 across low-power state transitions independently from the operating system and/or graphics driver software on the system.

The graphics processor core 500 may have greater than or fewer than the illustrated sub-cores 501A-501F, up to N modular sub-cores. For each set of N sub-cores, the graphics processor core 500 can also include shared function logic

510, shared and/or cache memory 512, a geometry/fixed function pipeline 514, as well as additional fixed function logic 516 to accelerate various graphics and compute processing operations. The shared function logic 510 can include logic units associated with the shared function logic 420 of FIG. 4 (e.g., sampler, math, and/or inter-thread communication logic) that can be shared by each N sub-cores within the graphics processor core 500. The shared and/or cache memory 512 can be a last-level cache for the set of N sub-cores 501A-501F within the graphics processor core 500, and can also serve as shared memory that is accessible by multiple sub-cores. The geometry/fixed function pipeline 514 can be included instead of the geometry/fixed function pipeline 536 within the fixed function block 530 and can include the same or similar logic units.

In one embodiment, the graphics processor core 500 includes additional fixed function logic 516 that can include various fixed function acceleration logic for use by the graphics processor core 500. In one embodiment, the additional fixed function logic 516 includes an additional geometry pipeline for use in position only shading. In position-only shading, two geometry pipelines exist, the full geometry pipeline within the geometry/fixed function pipeline 516, 536, and a cull pipeline, which is an additional geometry pipeline which may be included within the additional fixed function logic 516. In one embodiment, the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example, and in one embodiment the cull pipeline logic within the additional fixed function logic 516 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment, the additional fixed function logic 516 can also include machine-learning acceleration logic, such as fixed function matrix multiplication logic, for implementations including optimizations for machine learning training or inferencing.

Within each graphics sub-core 501A-501F includes a set of execution resources that may be used to perform graphics, media, and compute operations in response to requests by graphics pipeline, media pipeline, or shader programs. The graphics sub-cores 501A-501F include multiple EU arrays 502A-502F, 504A-504F, thread dispatch and inter-thread communication (TD/IC) logic 503A-503F, a 3D (e.g., texture) sampler 505A-505F, a media sampler 506A-506F, a shader processor 507A-507F, and shared local memory (SLM) 508A-508F. The EU arrays 502A-502F, 504A-504F each include multiple execution units, which are general-purpose graphics processing units capable of performing floating-point and integer/fixed-point logic operations in service of a graphics, media, or compute operation, including graphics, media, or compute shader programs. The TD/IC logic 503A-503F performs local thread dispatch and thread control operations for the execution units within a sub-core and facilitate communication between threads executing on the execution units of the sub-core. The 3D sampler 505A-505F can read texture or other 3D graphics related data into memory. The 3D sampler can read texture data differently based on a configured sample state and the texture format associated with a given texture. The media sampler 506A-506F can perform similar read operations based on the type and format associated with media data. In one embodiment, each graphics sub-core 501A-501F can alternately include a unified 3D and media sampler. Threads executing on the execution units within each of the sub-cores 501A-501F can make use of shared local memory 508A-508F within each sub-core, to enable threads executing within a thread group to execute using a common pool of on-chip memory.

Execution Units

Figure 6A:
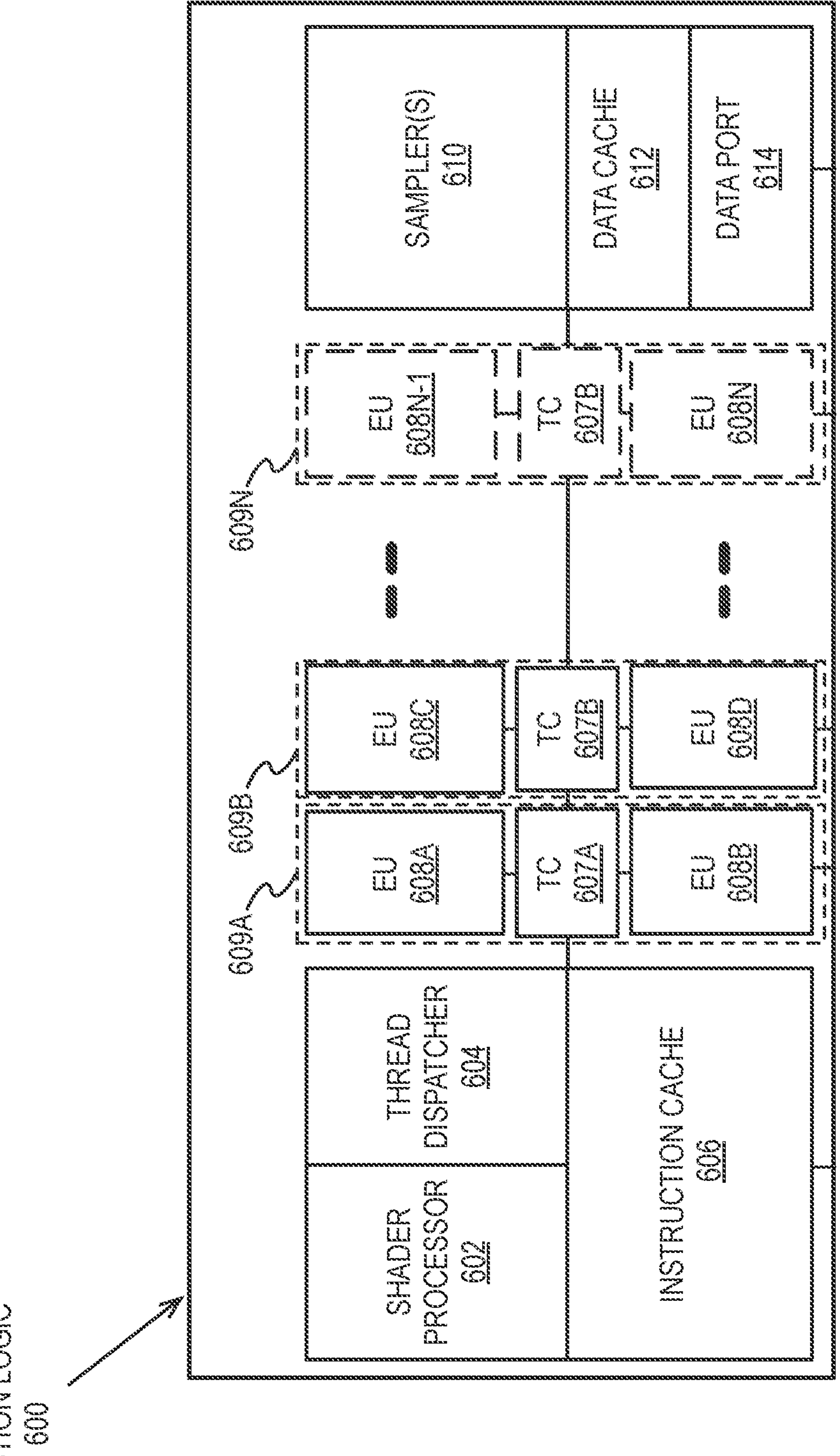
FIG. 6A-6B illustrate thread execution logic including an array of processing elements employed in a graphics processor core according to some embodiments.
Figure 6B:
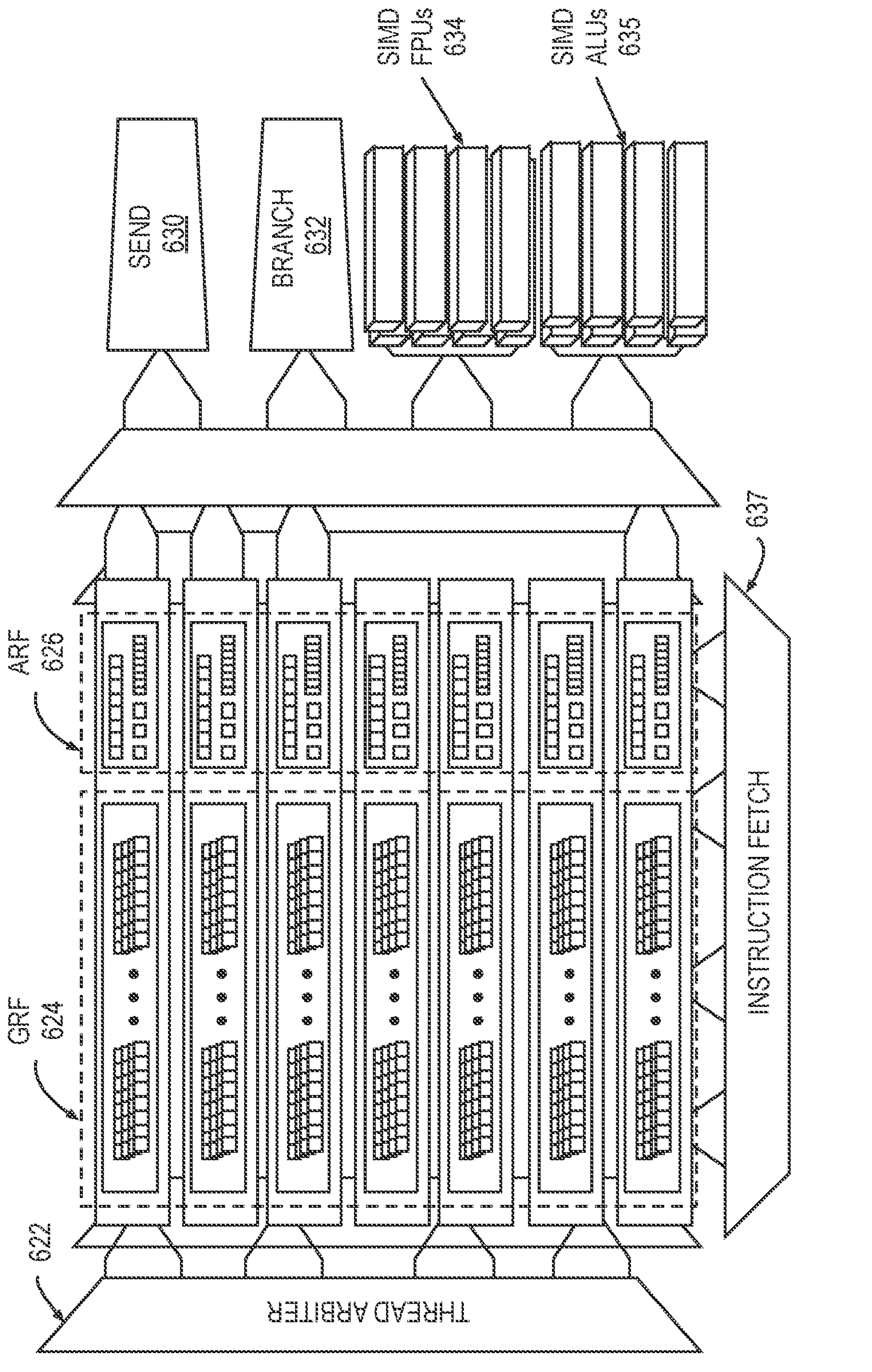

FIGS. 6A-6B illustrate thread execution logic 600 including an array of processing elements employed in a graphics processor core according to embodiments described herein. Elements of FIGS. 6A-6B having the same reference numbers (or names) as the elements of any other figure herein can operate or function in any manner similar to that described elsewhere herein, but are not limited to such. FIG. 6A illustrates an overview of thread execution logic 600, which can include a variant of the hardware logic illustrated with each sub-core 501A-501F of FIG. 5. FIG. 6B illustrates exemplary internal details of an execution unit.

As illustrated in FIG. 6A, in some embodiments thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment, the scalable execution unit array can dynamically scale by enabling or disabling one or more execution units (e.g., any of execution unit 608A, 608B, 608C, 608D, through 608N-1 and 608N) based on the computational requirements of a workload. In one embodiment, the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general-purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment, the thread dispatcher includes logic to arbitrate thread initiation requests from the graphics and media pipelines and instantiate the requested threads on one or more execution unit in the execution units 608A-608N. For example, a geometry pipeline can dispatch vertex, tessellation, or geometry shaders to the thread execution logic for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 609A-609N having thread control logic (607A-607N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 609A-609N includes at least two execution units. For example, fused execution unit 609A includes a first EU 608A, second EU 608B, and thread control logic 607A that is common to the first EU 608A and the second EU 608B. The thread control logic 607A controls threads executed on the fused graphics execution unit 609A, allowing each EU within the fused execution units 609A-609N to execute using a common instruction pointer register.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, shader processor 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 to output processed data to memory for further processing on a graphics processor output pipeline. In some embodiments, the data port 614 includes or couples to one or more cache memories (e.g., data cache 612) to cache data for memory access via the data port.

As illustrated in FIG. 6B, a graphics execution unit 608 can include an instruction fetch unit 637, a general register file array (GRF) 624, an architectural register file array (ARF) 626, a thread arbiter 622, a send unit 630, a branch unit 632, a set of SIMD floating point units (FPUs) 634, and in one embodiment a set of dedicated integer SIMD ALUs 635. The GRF 624 and ARF 626 includes the set of general register files and architecture register files associated with each simultaneous hardware thread that may be active in the graphics execution unit 608. In one embodiment, per thread architectural state is maintained in the ARF 626, while data used during thread execution is stored in the GRF 624. The execution state of each thread, including the instruction pointers for each thread, can be held in thread-specific registers in the ARF 626.

In one embodiment, the graphics execution unit 608 has an architecture that is a combination of Simultaneous Multi-Threading (SMT) and fine-grained Interleaved Multi-Threading (IMT). The architecture has a modular configuration that can be fine-tuned at design time based on a target number of simultaneous threads and number of registers per execution unit, where execution unit resources are divided across logic used to execute multiple simultaneous threads.

In one embodiment, the graphics execution unit 608 can co-issue multiple instructions, which may each be different instructions. The thread arbiter 622 of the graphics execution unit thread 608 can dispatch the instructions to one of the send unit 630, branch unit 642, or SIMD FPU(s) 634 for execution. Each execution thread can access 128 general-purpose registers within the GRF 624, where each register can store 32 bytes, accessible as a SIMD 8-element vector of 32-bit data elements. In one embodiment, each execution unit thread has access to 4 Kbytes within the GRF 624, although embodiments are not so limited, and greater or fewer register resources may be provided in other embodiments. In one embodiment, up to seven threads can execute simultaneously, although the number of threads per execution unit can also vary according to embodiments. In an embodiment in which seven threads may access 4 Kbytes, the GRF 624 can store a total of 28 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 630. In one embodiment, branch instructions are dispatched to a dedicated branch unit 632 to facilitate SIMD divergence and eventual convergence.

In one embodiment, the graphics execution unit 608 includes one or more SIMD floating point units (FPU(s)) 634 to perform floating-point operations. In one embodiment, the FPU(s) 634 also support integer computation. In one embodiment, the FPU(s) 634 can SIMD execute up to M number of 32-bit floating-point (or integer) operations, or SIMD execute up to 2 M 16-bit integer or 16-bit floating-point operations. In one embodiment, at least one of the FPU(s) provides extended math capability to support high-throughput transcendental math functions and double precision 64-bit floating-point. In some embodiments, a set of 8-bit integer SIMD ALUs 635 are also present, and may be specifically optimized to perform operations associated with machine learning computations.

In one embodiment, arrays of multiple instances of the graphics execution unit 608 can be instantiated in a graphics sub-core grouping (e.g., a sub-slice). For scalability, product architects can choose the exact number of execution units per sub-core grouping. In one embodiment, the execution unit 608 can execute instructions across a plurality of execution channels. In a further embodiment, each thread executed on the graphics execution unit 608 is executed on a different channel.

Figure 7:
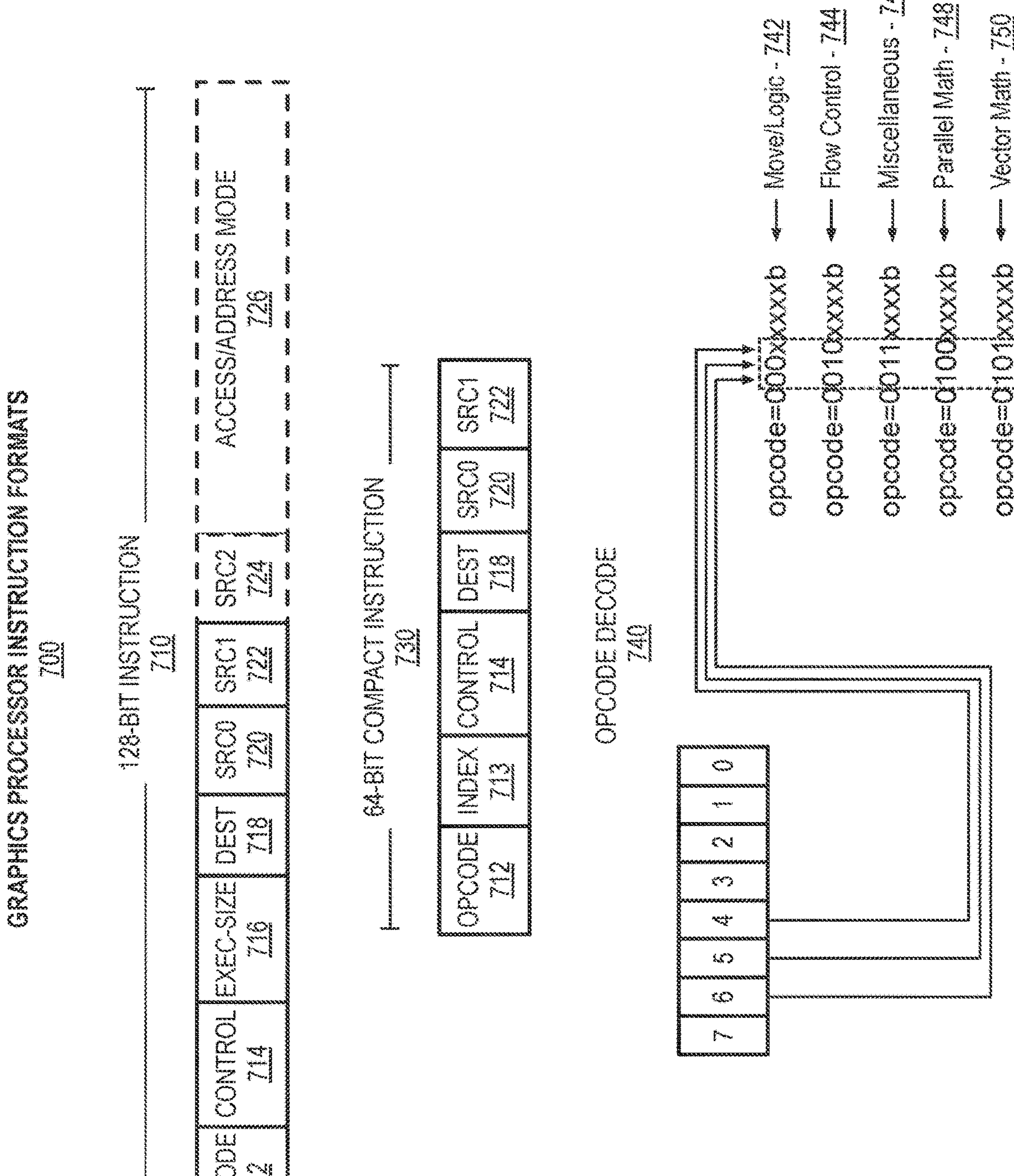
FIG. 7 is a block diagram illustrating a graphics processor instruction formats according to some embodiments.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment, the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
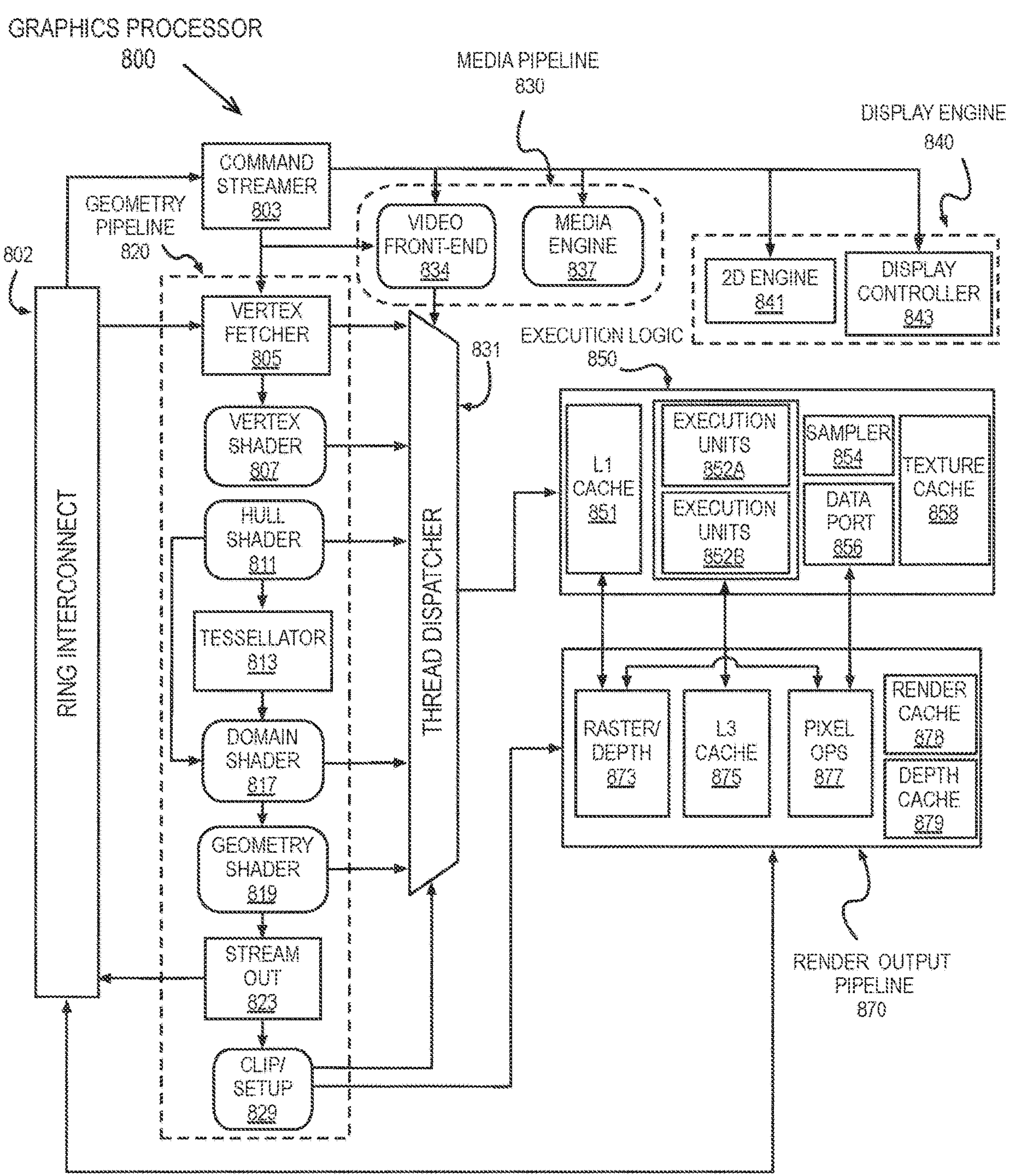
FIG. 8 is a block diagram of another embodiment of a graphics processor.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment, the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine

837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figures 9A, 9B:
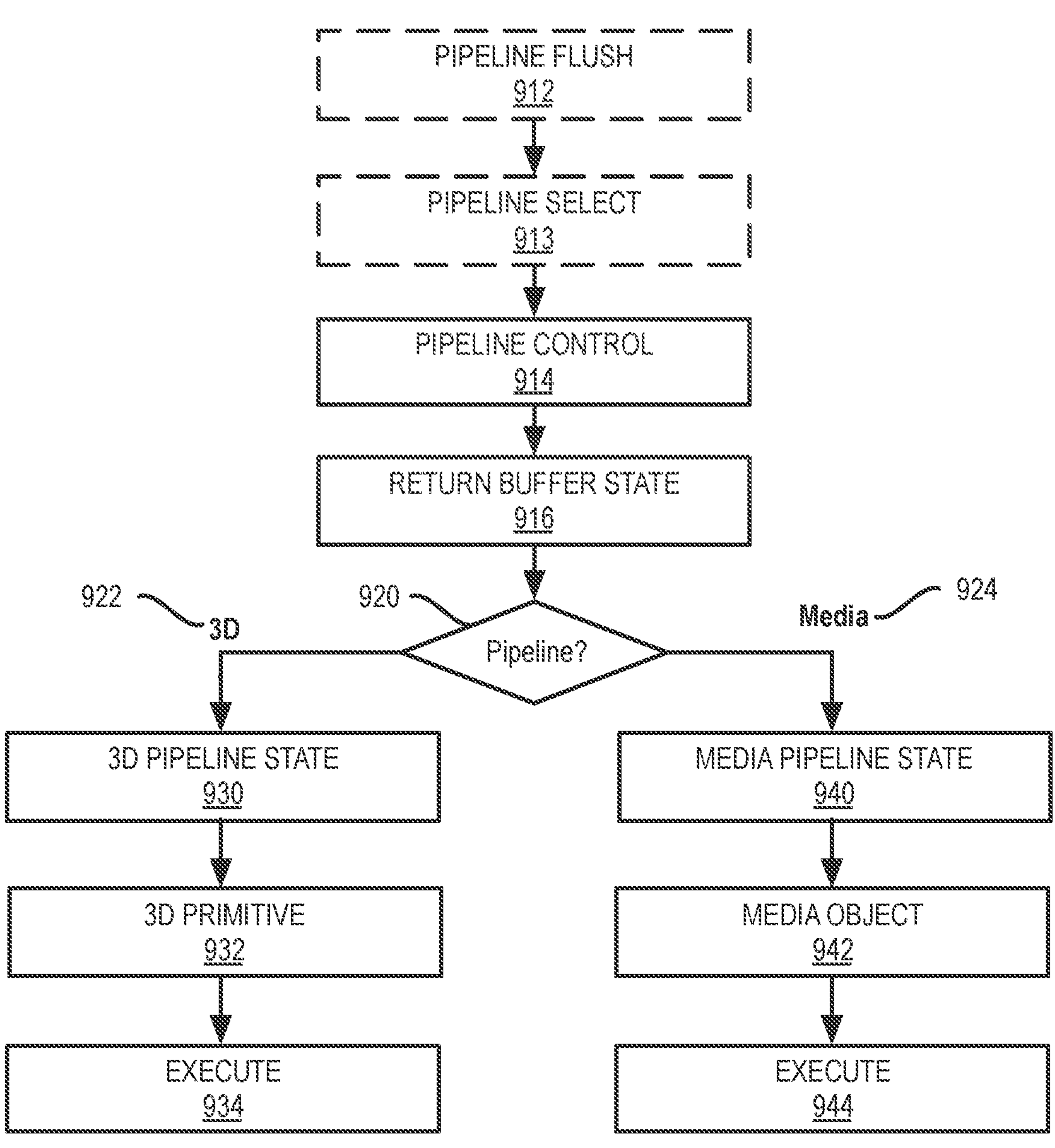
FIG. 9A is a block diagram illustrating a graphics processor command format according to an embodiment.
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
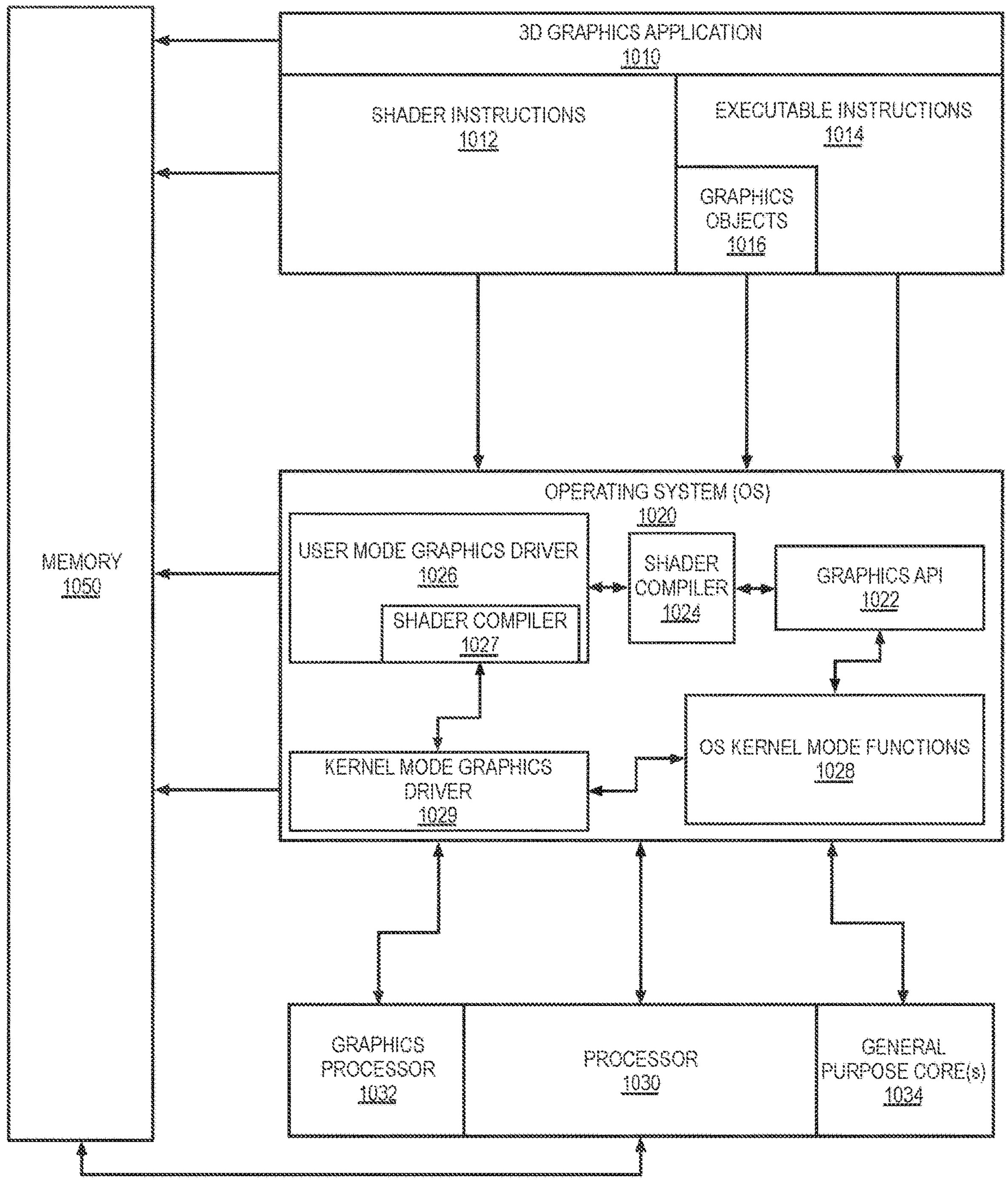
FIG. 10 illustrates exemplary graphics software architecture for a data processing system according to some embodiments.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

FIG. 11A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
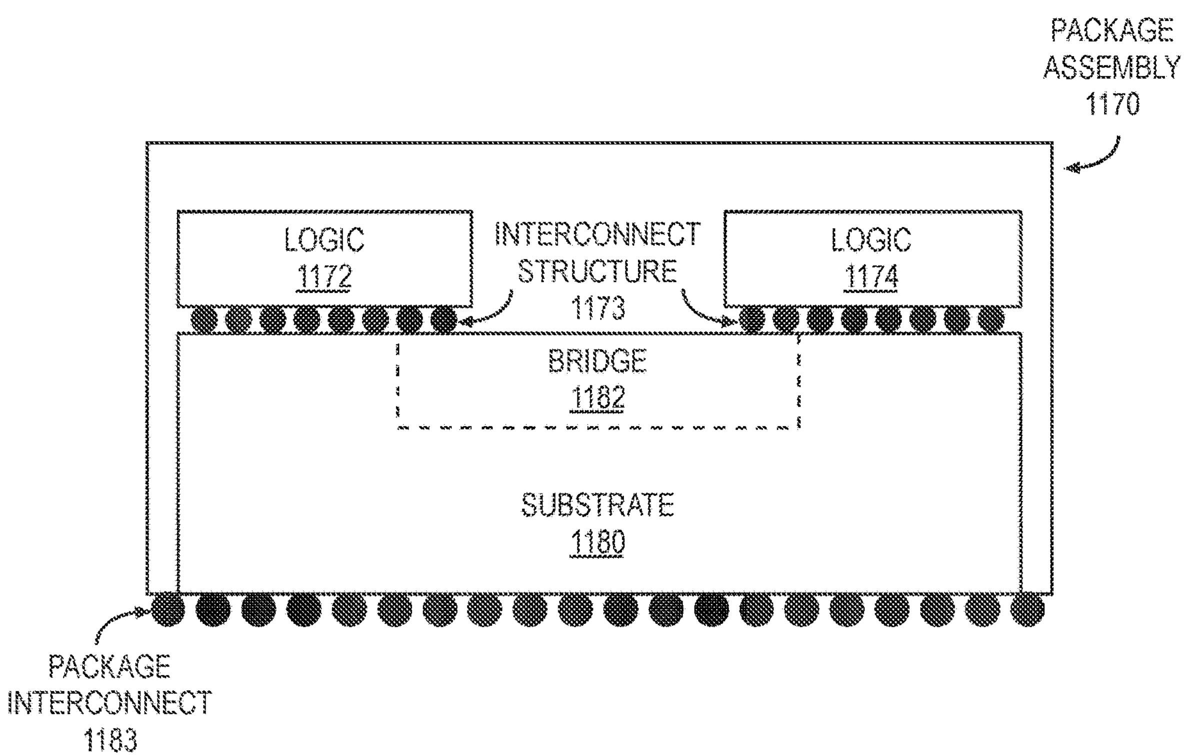
FIG. 11B illustrates a cross-section side view of an integrated circuit package assembly according to some embodiments.

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The package substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Exemplary System on a Chip Integrated Circuit

Figure 12:
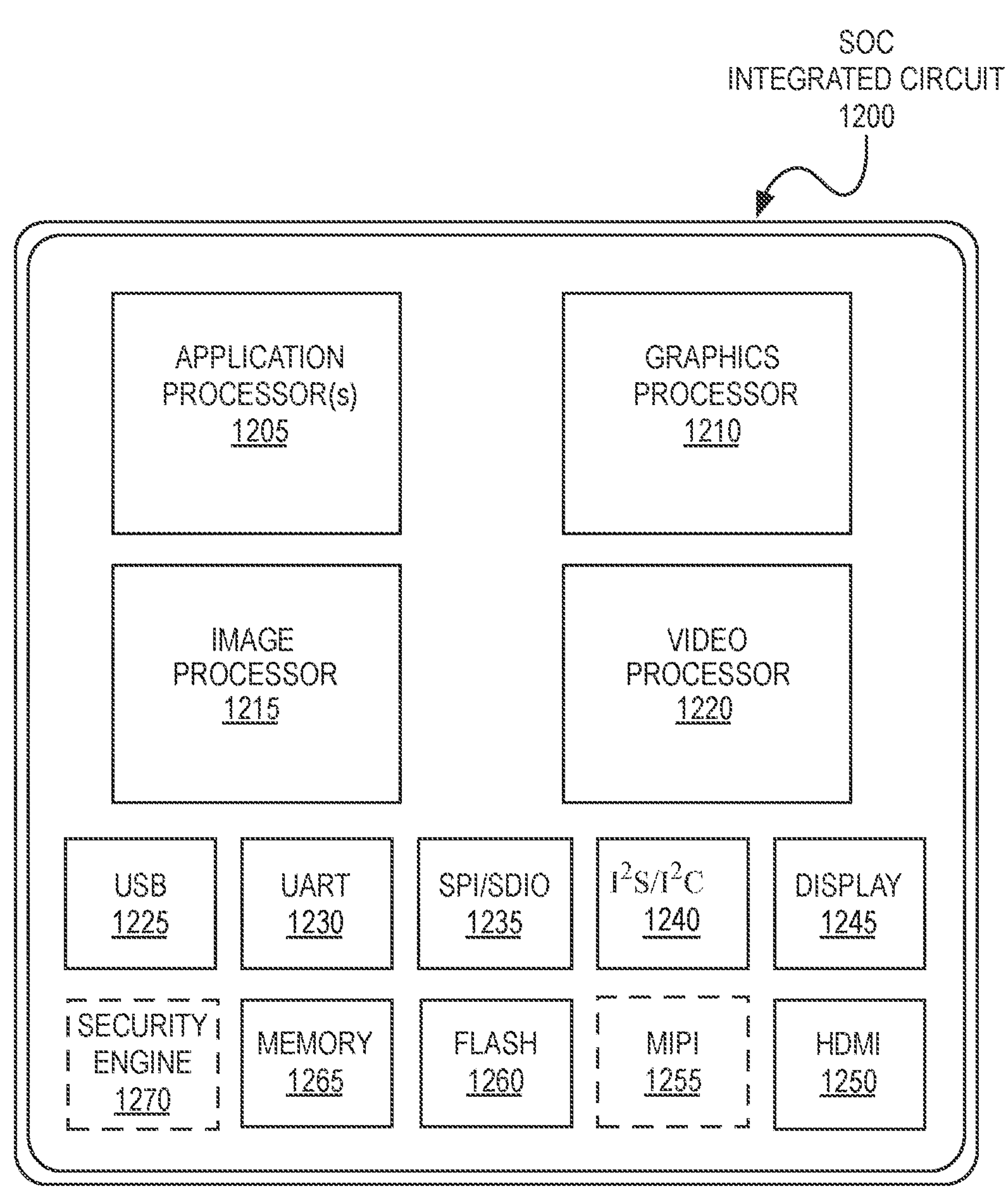
FIG. 12 is a block diagram illustrating an exemplary system on a chip integrated circuit that may be fabricated using one or more IP cores, according to an embodiment.

FIGS. 12-14 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Figure 13A:
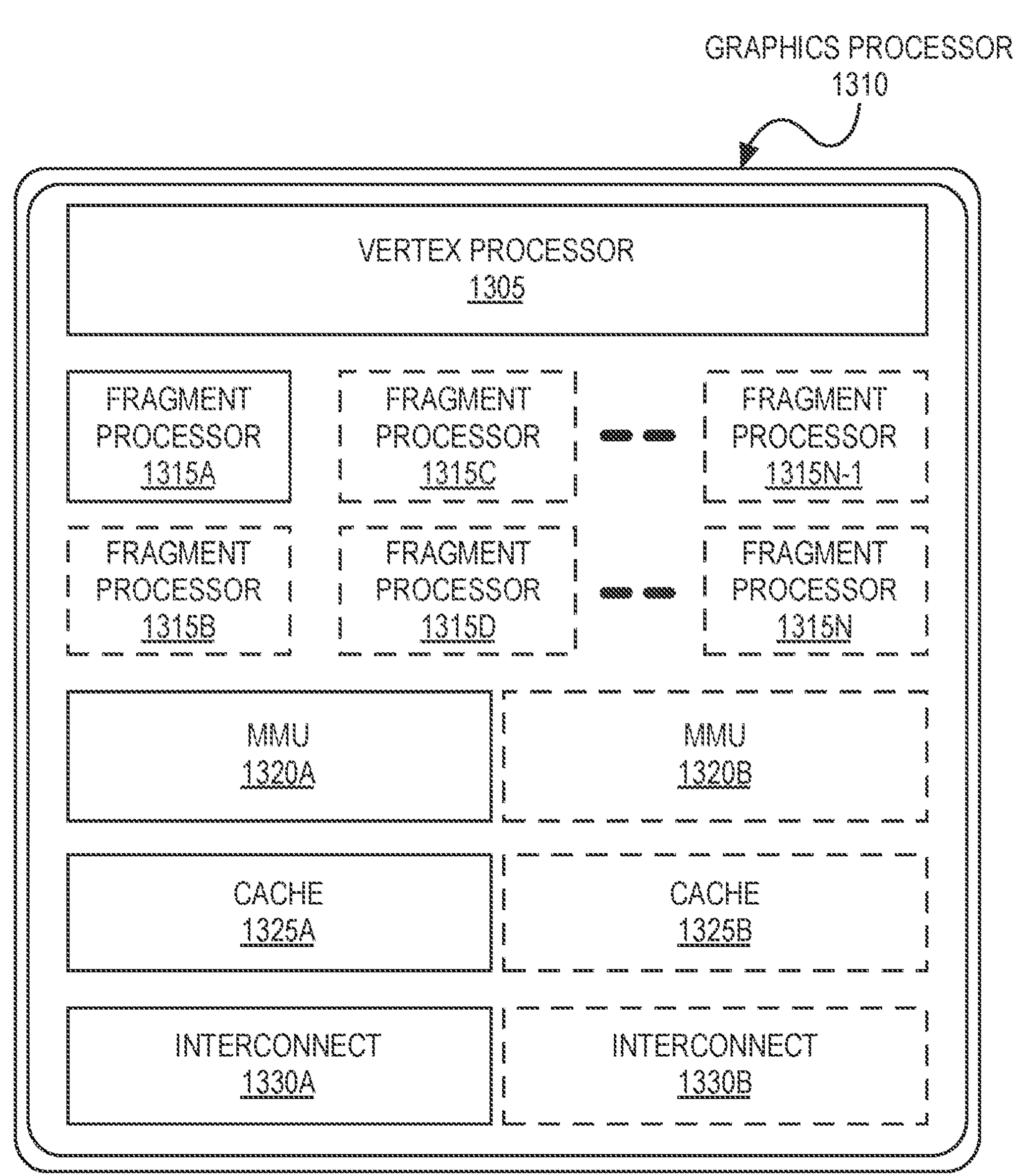
FIGS. 13A-13B are block diagrams illustrating exemplary graphics processors for use within an System on Chip (SoC), according to embodiments described herein.
Figure 13B:
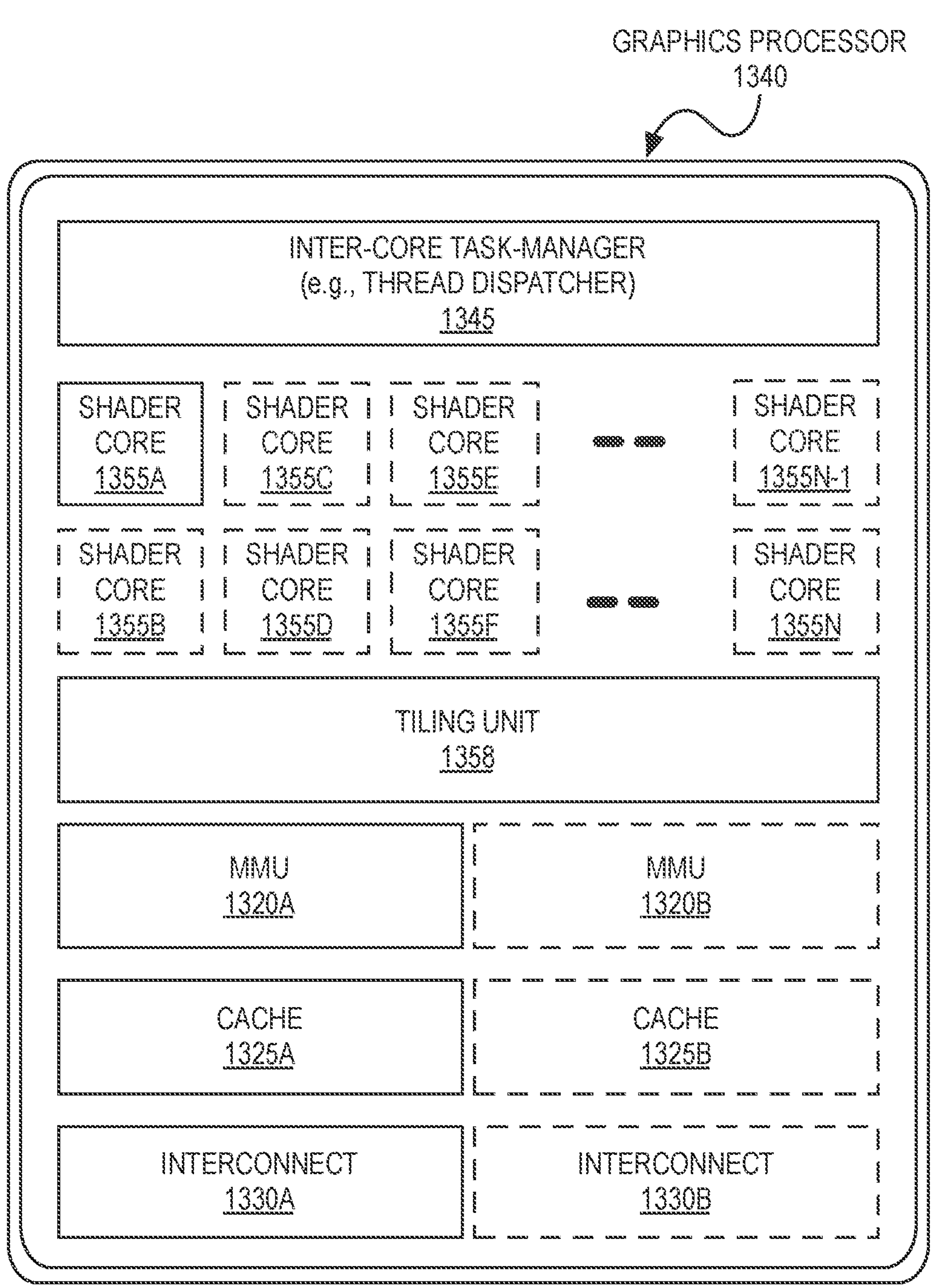

FIGS. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to an embodiment. FIG. 13B illustrates an additional exemplary graphics processor 1340 of a system on a chip integrated circuit that may be fabricated using one or more IP cores, according to an embodiment. Graphics processor 1310 of FIG. 13A is an example of a low power graphics processor core. Graphics processor 1340 of FIG. 13B is an example of a higher performance graphics processor core. Each of the graphics processors 1310, 1340 can be variants of the graphics processor 1210 of FIG. 12.

As shown in FIG. 13A, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment, the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 13B, graphics processor 1340 includes the one or more MMU(s) 1320A-1320B, caches 1325A-1325B, and circuit interconnects 1330A-1330B of the graphics processor 1310 of FIG. 13A. Graphics processor 1340 includes one or more shader core(s) 1355A-1355N (e.g., 1455A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Figure 14A:
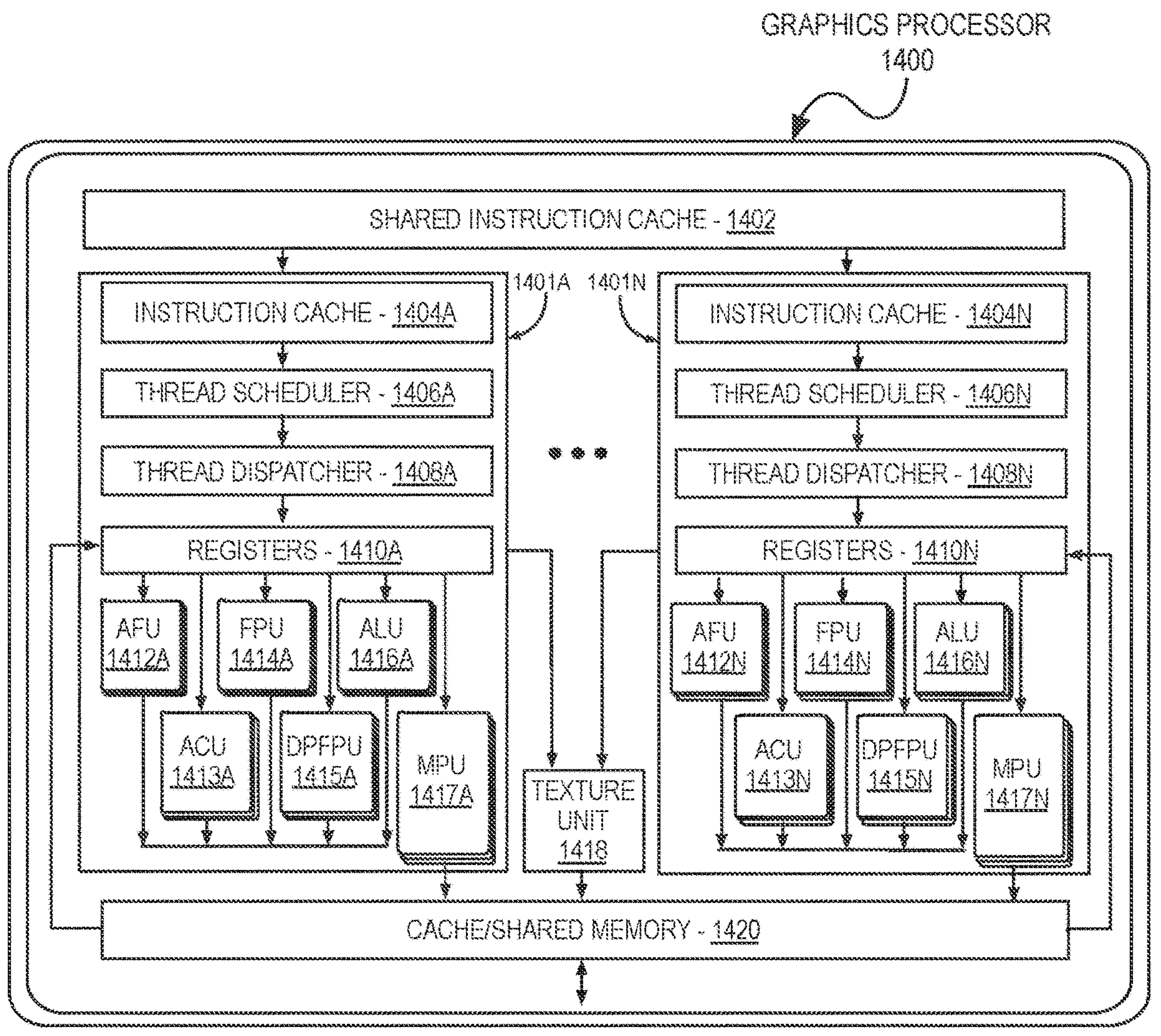
FIGS. 14A-14B illustrate additional exemplary graphics processor logic according to embodiments described herein.
Figure 14B:
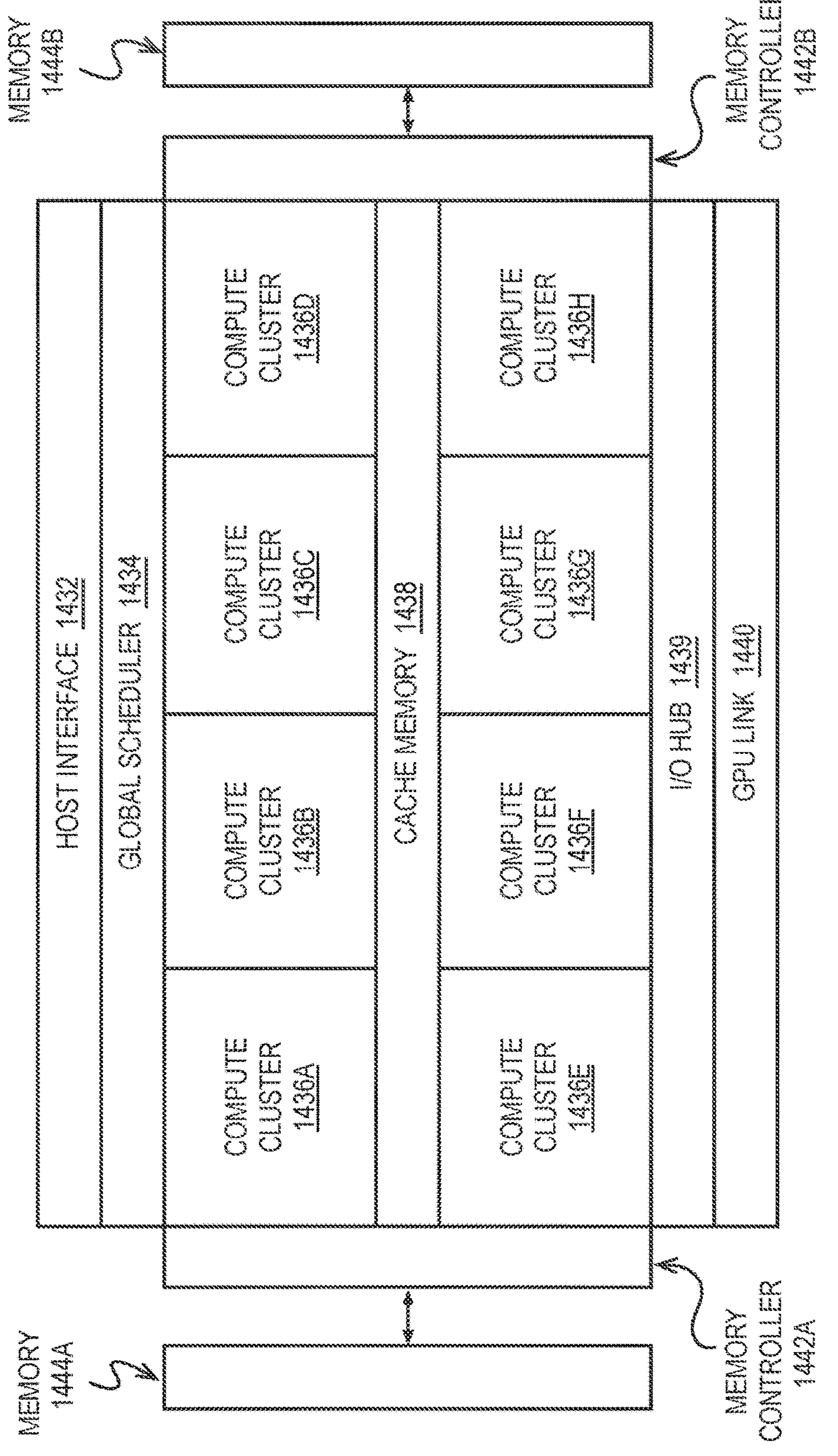

FIGS. 14A-14B illustrate additional exemplary graphics processor logic according to embodiments described herein. FIG. 14A illustrates a graphics core 1400 that may be included within the graphics processor 1210 of FIG. 12, and may be a unified shader core 1355A-1355N as in FIG. 13B. FIG. 14B illustrates an additional general-purpose graphics processing unit 1430, which is a highly-parallel general-purpose graphics processing unit suitable for deployment on a multi-chip module.

As shown in FIG. 14A, the graphics core 1400 includes a shared instruction cache 1402, a texture unit 1418, and a cache/shared memory 1420 that are common to the execution resources within the graphics core 1400. The graphics core 1400 can include multiple slices 1401A-1401N or partition for each core, and a graphics processor can include multiple instances of the graphics core 1400. The slices 1401A-1401N can include support logic including a local instruction cache 1404A-1404N, a thread scheduler 1406A-1406N, a thread dispatcher 1408A-1408N, and a set of registers 1410A-1440N. To perform logic operations, the slices 1401A-1401N can include a set of additional function units (AFUs 1412A-1412N), floating-point units (FPU 1414A-1414N), integer arithmetic logic units (ALUs 1416-1416N), address computational units (ACU 1413A-1413N), double-precision floating-point units (DPFPU 1415A-1415N), and matrix processing units (MPU 1417A-1417N).

Some of the computational units operate at a specific precision. For example, the FPUs 1414A-1414N can perform single-precision (32-bit) and half-precision (16-bit) floating point operations, while the DPFPUs 1415A-1415N perform double precision (64-bit) floating point operations. The ALUs 1416A-1416N can perform variable precision integer operations at 8-bit, 16-bit, and 32-bit precision, and can be configured for mixed precision operations. The MPUs 1417A-1417N can also be configured for mixed precision matrix operations, including half-precision floating point and 8-bit integer operations. The MPUs 1417-1417N can perform a variety of matrix operations to accelerate machine learning application frameworks, including enabling support for accelerated general matrix to matrix multiplication (GEMM). The AFUs 1412A-1412N can perform additional logic operations not supported by the floating-point or integer units, including trigonometric operations (e.g., Sine, Cosine, etc.).

As shown in FIG. 14B, a general-purpose processing unit (GPGPU) 1430 can be configured to enable highly-parallel compute operations to be performed by an array of graphics processing units. Additionally, the GPGPU 1430 can be linked directly to other instances of the GPGPU to create a multi-GPU cluster to improve training speed for particularly deep neural networks. The GPGPU 1430 includes a host interface 1432 to enable a connection with a host processor. In one embodiment, the host interface 1432 is a PCI Express interface. However, the host interface can also be a vendor specific communications interface or communications fabric. The GPGPU 1430 receives commands from the host processor and uses a global scheduler 1434 to distribute execution threads associated with those commands to a set of compute clusters 1436A-1436H. The compute clusters 1436A-1436H share a cache memory 1438. The cache memory 1438 can serve as a higher-level cache for cache memories within the compute clusters 1436A-1436H.

The GPGPU 1430 includes memory 1444A-1444B coupled with the compute clusters 1436A-1436H via a set of memory controllers 1442A-1442B. In various embodiments, the memory 1444A-1444B can include various types of memory devices including dynamic random-access memory (DRAM) or graphics random access memory, such as synchronous graphics random access memory (SGRAM), including graphics double data rate (GDDR) memory.

In one embodiment, the compute clusters 1436A-1436H each include a set of graphics cores, such as the graphics core 1400 of FIG. 14A, which can include multiple types of integer and floating point logic units that can perform computational operations at a range of precisions including suited for machine learning computations. For example, and in one embodiment at least a subset of the floating point units in each of the compute clusters 1436A-1436H can be configured to perform 16-bit or 32-bit floating point operations, while a different subset of the floating point units can be configured to perform 64-bit floating point operations.

Multiple instances of the GPGPU 1430 can be configured to operate as a compute cluster. The communication mechanism used by the compute cluster for synchronization and data exchange varies across embodiments. In one embodiment, the multiple instances of the GPGPU 1430 communicate over the host interface 1432. In one embodiment, the GPGPU 1430 includes an I/O hub 1439 that couples the GPGPU 1430 with a GPU link 1440 that enables a direct connection to other instances of the GPGPU. In one embodiment, the GPU link 1440 is coupled to a dedicated GPU-to-GPU bridge that enables communication and synchronization between multiple instances of the GPGPU 1430. In one embodiment, the GPU link 1440 couples with a high-speed interconnect to transmit and receive data to other GPGPUs or parallel processors. In one embodiment, the multiple instances of the GPGPU 1430 are located in separate data processing systems and communicate via a network device that is accessible via the host interface 1432. In one embodiment, the GPU link 1440 can be configured to enable a connection to a host processor in addition to or as an alternative to the host interface 1432.

While the illustrated configuration of the GPGPU 1430 can be configured to train neural networks, one embodiment provides alternate configuration of the GPGPU 1430 that can be configured for deployment within a high performance or low power inferencing platform. In an inferencing configuration, the GPGPU 1430 includes fewer of the compute clusters 1436A-1436H relative to the training configuration. Additionally, the memory technology associated with the memory 1434A-1434B may differ between inferencing and training configurations, with higher bandwidth memory technologies devoted to training configurations. In one embodiment, the inferencing configuration of the GPGPU 1430 can support inferencing specific instructions. For example, an inferencing configuration can provide support for one or more 8-bit integer dot product instructions, which are commonly used during inferencing operations for deployed neural networks.

Novel Technique—Overview

There is not yet a definition of how the PCC draft standard should define interoperability signaling and conformance points. Embodiments provide for a novel technique for defining interoperability signaling and conformance points, to enable ecosystem specification of PCC products, which allow for flexible video decode and GPU capability.

Conventionally, more immersive forms of interaction and communication are being enabled for three-dimensional (3D) representation of the world to allow for processing devices and machines to better understand and interpret the world, where 3D point clouds are regarded as an enabling representation of such information. For example, a point cloud is regarded as a set of points in a 3D space, where each point is associated attributes, such as properties, colors, etc. Point clouds may be used to reconstruct a scene or an object as a composition of these points, where such points are captured using multiple camera and depth sensors in various setups and having made up of from thousands to billions of points to realistically represent reconstructed scenes. Similarly, geometry may refer to locations in 3D space of points in a point cloud, such as (x, y, z) coordinates of the points, while attribute may refer to a value or a set of values, other than geometry, associated with a point, such as RGB color values, where I reflects reflectance. Spatial random access refers to decoding a point cloud corresponding to a predefined region from a compressed point cloud, while progressive/scalable refers to first decode of a coarse point cloud and then refining it with additional data from a compressed bit stream. An operating point may refer to a performance point of a particular codec for a particular data at a target bit rate or compression ratio. Further, 1 Mbit/s means 1,000,000 bits per second.

There are a number of conventional technologies associated with point clouds, such as compression technologies to reduce the amount of data needed to represent a point cloud for lossy compression of point clouds for use in real-time communications and six degrees of freedom (6DoF) virtual reality, etc. For example, standards can address compression of geometry and attributes, such as colors and reflectance, coding of sequences of point clouds, random access to subsets of point clouds, etc. Similarly, standards are needed to address other areas associated with point clouds, such as, in one embodiment, defining interoperability signaling and conformance points to enable ecosystem specification of PCC products that allow for flexible video decode and GPU capability.

It is contemplated that a point cloud may be defined as a set of (x, y, z) coordinates, where x, y, and z have a finite precision and dynamic range, where each (x, y, z) has multiple attributes (color, properties, reflectance, etc.) associated with it (such as a1, a2, a3, . . . ), where each point has the same number of attributes associated with it as the other points. An attribute refers to a value or set of values, other than geometry, associated with a point, such as red green blue (RGB) color values and I for reflectance. Further, for example, geometry may refer to locations in 3D space of points in a point cloud, such as (x, y, z) coordinates of the points. A point cloud frame may refer to a given time instant or a time range, such as for a dynamically acquired point clouds. In some implementations, six projection angles are used in the PCC standard test model, with the projection angles corresponding to angles pointing to the centers of six faces of a rectangular solid that bound the object represented by the point cloud data. While six projection angles are described, other number of angles could possibly be used in different implementations.

Video codecs, such as advanced video coding (AVC) and high efficiency video coding (HEVC), have profiles and levels to define interoperability points. Each coded video sequence contains profile and level indicator syntax elements in the sequence parameter set, where a profile indicates a set of tools needed to decode the coded video bitstream, while a level indicates a performance level needed to decode the coded video bitstream, such as in terms of maximum picture size and pixel rate. For example, an output of the video decoder is considered a conformance point, which means that video decoders which conform to a particular profile and level are needed to output pictures that match a specified decoder.

Further, the PCC draft standard uses multiple projections of point clouds onto planes for texture and depth. For example, any projected texture images are combined into a single texture image, while any projected depth images are combined into a single depth image, which are then encoded using a normal two-dimensional (2D) video codec, such as HEVC, along with some metadata.

Any existing video codec interoperability point definitions do not apply directly to PCC coding, where it is expected that different GPUs would likely use different algorithms for converting any decoded PCC pictures to points, so different implementations may yield different numbers of points in the point cloud when decoding the same compressed PCC bitstream. It would be useful to allow variation in performance, but in such a way that client quality capability can be expressed.

In the PCC standard, in one embodiment, a conformance point is defined as a video decoder output, as is done in typical video codecs, such as including in the standard description of a reference point cloud reconstructor. Further, in one embodiment, a syntax element is added with an encoder in a high-level syntax to indicate, for each coded picture, a number of points created by the reference point cloud reconstructor. The added syntax element can be used by a decoder to determine if it is able to decode a bitstream and reconstruct the point cloud when the decoder has limited reconstruction capability. In one embodiment, any client point cloud reconstructor levels are defined relative to the reference point cloud reconstructor.

Embodiments provide for a novel technique for offering the ecosystem with a way to specify quality and performance levels of PCC products, while allowing decoupling of video decode capability and point cloud reconstructing capability. Embodiments would allow for adoption of this novel technique to the PCC standard and being used in all implementations of the standard.

In the PCC standard, in one embodiment, the normal HEVC profile and level signaling are used, while the conformance point is defined in the normal way as the output of the video decoder. For example, that decoded picture output is not in a form that is to be viewed directly by viewers. Further, in one embodiment, a specification of a reference point cloud reconstructor is included in the PCC standard (such as in an informative section) that describes how to convert the decoded PCC bitstreams (including texture and depth decoded images and metadata) into points in a point cloud.

Further, in one embodiment, somewhere in High Level Syntax (Supplemental Enhancement Information message, parameters set, picture header, etc.) of the PCC bitstream, there may be included a syntax element to indicate how many points that the reference point cloud reconstructor may create for the coded picture, such as number of points, or for the coded sequence, etc., where, for example, a fixed length code syntax element may be used for the number of points.

Furthermore, in one embodiment, client reconstructor levels may be defined in the PCC standard specification, where the client reconstructor levels may be used to specify the capability of the decoder/client relative to the reference point cloud reconstructor. The capability may be defined using a number of points created by the client reconstructor, such as a percentage of the reference reconstructor's num_points, and point geometry distortion metrics of the client generated point cloud.

The same geometric distortion metrics may be utilized as they are used in the PCC development effort for assessing the quality and accuracy of the decoded point cloud versus that of the source point cloud; but instead, using the reference reconstructor's points as the basis for that comparison. For example, the PCC Call for Proposals document (N16763) defines two geometric distortion metrics, such as D1 and D2, where D1 represents point-to-point distances, and D2 represents point-to-plane distances.

In one embodiment, the following may be regarded as a client reconstruct level definition: client reconstruct level 1 is able to create 100% of num_points, at matching positions; client reconstruct level 2 can create at least 75% of num_points with a D1>X and D2>Y; and client reconstruct level 3 can create at least 50% of num_points with a D1>U and D2>V.

A third-party group, such as an ultra-high definition (UHD) Alliance, may be given the responsibility to specify minimum performance capabilities, such as for certification, either using the client reconstruct level or a ratio of points to the reference reconstructor and the geometric distortion metrics.

Figure 15A:
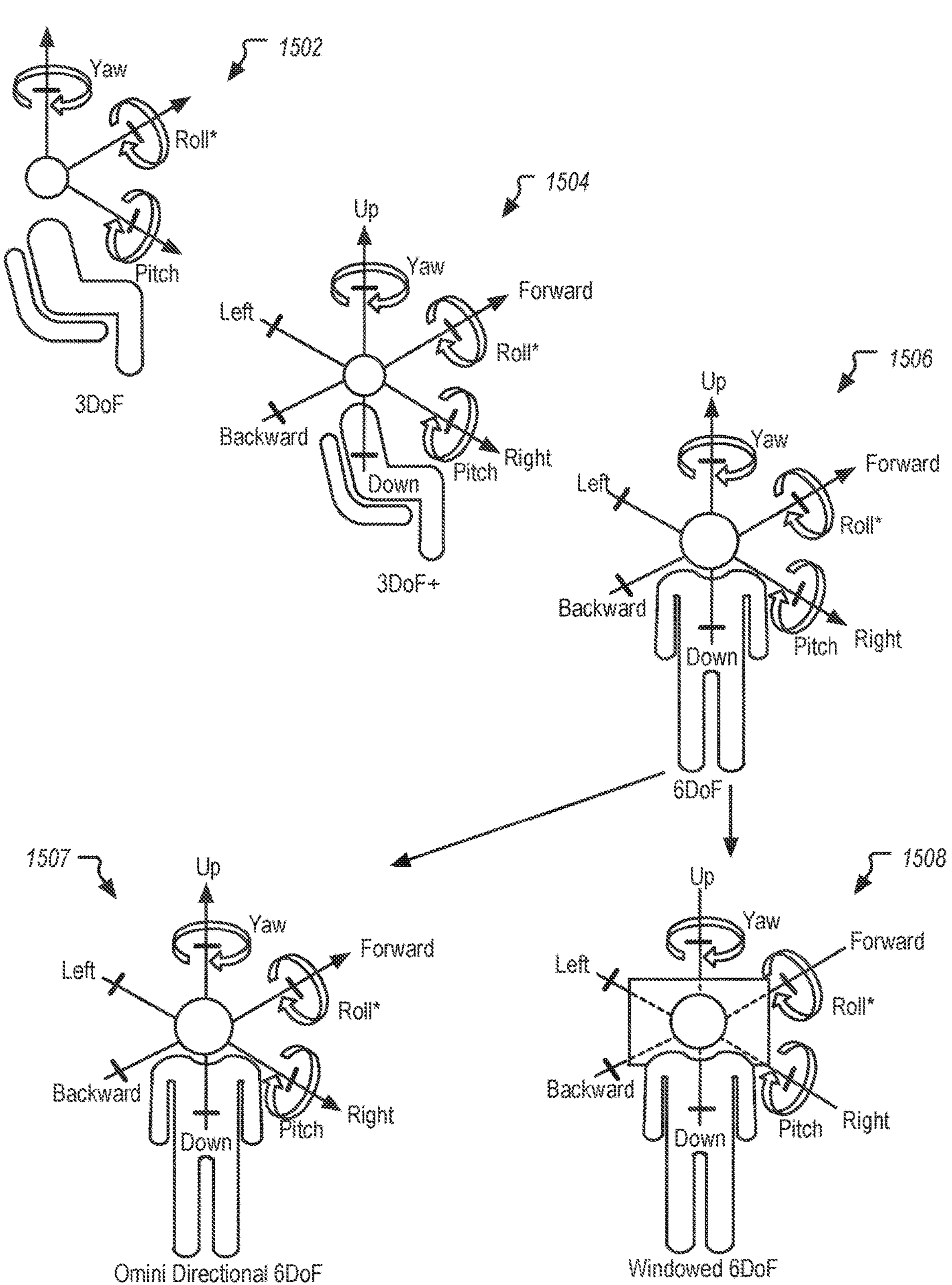
FIG. 15A illustrates multiple forms of immersive video.

FIG. 15A illustrates multiple forms of immersive video. Immersive video can be presented in multiple forms depending on the degrees of freedom available to a viewer. Degrees of freedom refers to the number of different directions that an object can move in 3D space. Immersive video can be viewed via a head mounted display that includes tracking for position and orientation. Example forms of immersive video include 3DoF 1502, 3DoF Plus 1504, and full 6DoF 1506. In addition to immersive video in full 6DoF 1506, 6DoF immersive video includes omni-directional 6DoF 1507, and windowed 6DoF 1508.

For video in 3DoF 1502 (e.g., 360-degree video), a viewer can change orientation (e.g., yaw, pitch, roll) but not position. For video in 3DoF Plus 1504, a viewer can change orientation and make small changes to position. For video in 6DoF 1506, a viewer can change orientation and change position. More limited forms of 6DoF video are also available. Video in omni-directional 6DoF 1507 enables a viewer being able to take multiple steps in the virtual scene. Video in windowed 6DoF 1508 allows a viewer to change orientation and position, but the viewers is constrained to a limited view area. Increasing the available degrees of freedom in an immersive video generally includes increasing the amount and complexity of data involved in video generation, encode, decode, and playback.

Figure 15B:
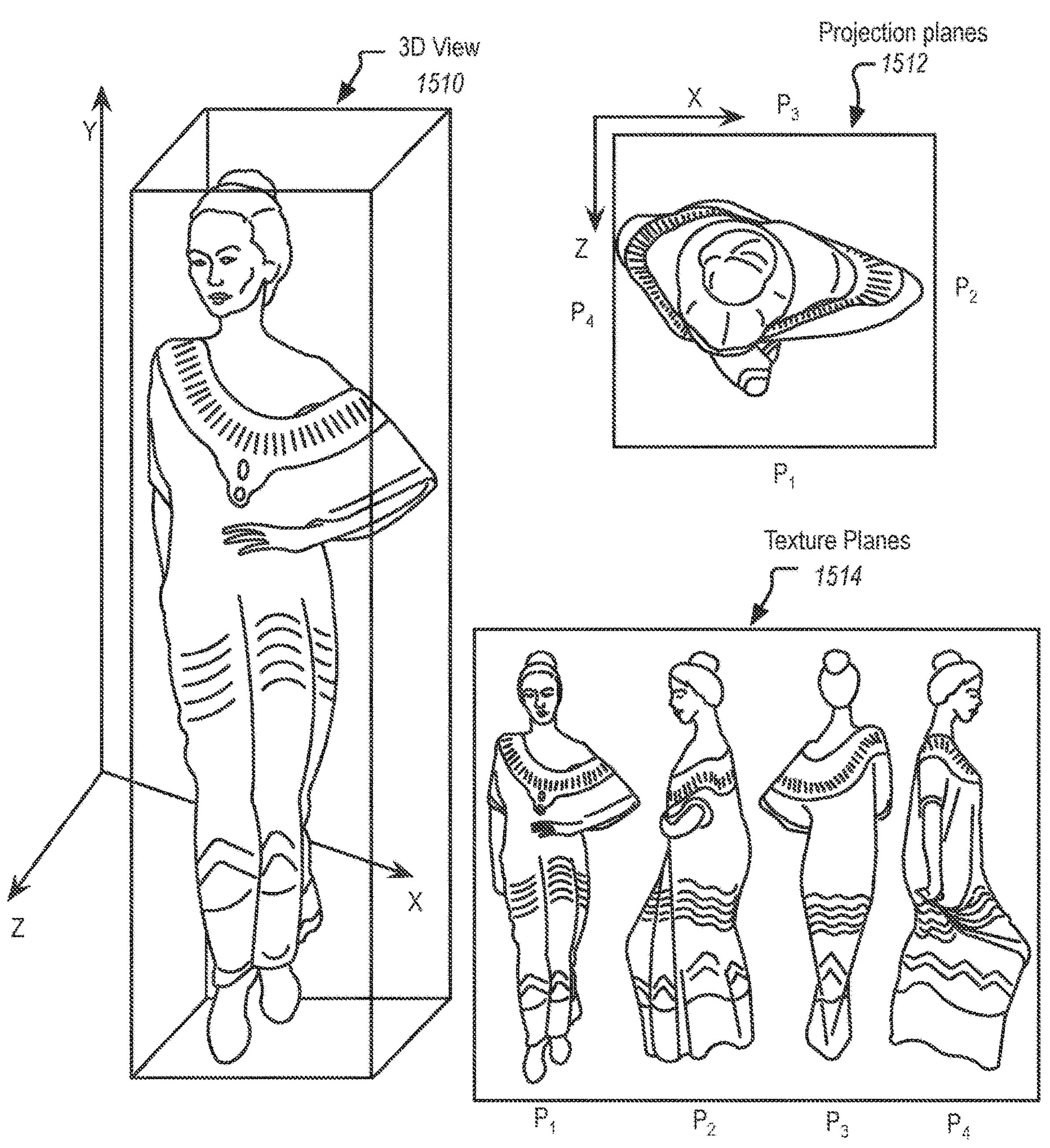
FIG. 15B illustrates image projection and texture planes for immersive video.

FIG. 15B illustrates image projection and texture planes for immersive video. A 3D view 1510 of video content can be generated using data from multiple cameras. Multiple projection planes 1512 can be used to generate geometry data for video content. Multiple texture planes 1514 can be derived for the projection planes 1512 used to generate the geometry data. The texture planes 1514 can be applied to 3D models that are pre-generated or generated based on a point cloud derived from video data. The multiple projection planes 1512 can be used to generate multiple 2D projections, each projection associated with a projection plane.

Figure 16:
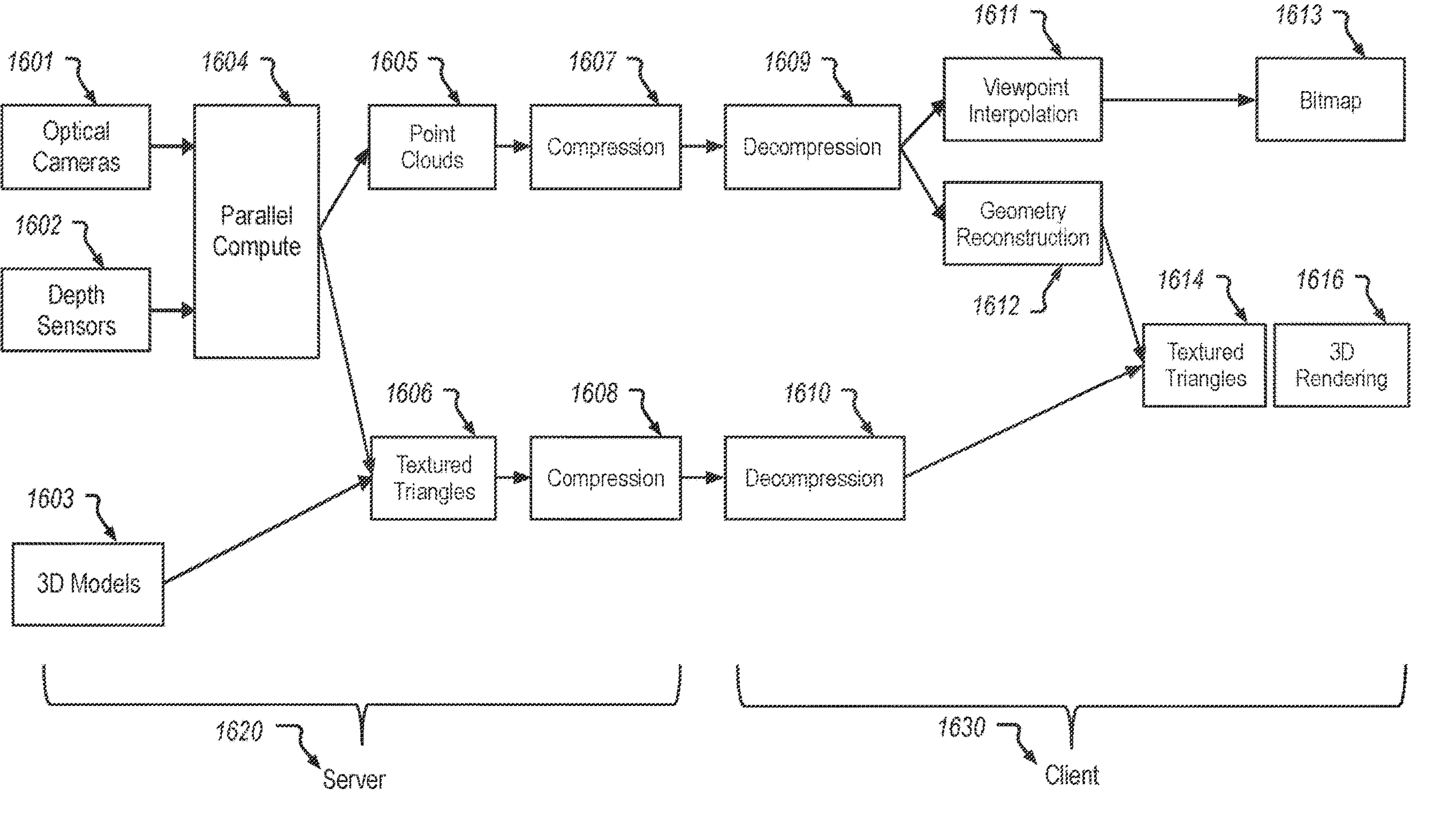
FIG. 16 illustrates a client-server system by which immersive video content can be generated and encoded by a server infrastructure for transmission to one or more client devices.

FIG. 16 illustrates a client-server system by which immersive video content can be generated and encoded by a server 1620 infrastructure for transmission to one or more client 1630 devices. The client 1630 devices can then decompress and render the immersive video content. In one embodiment, one or more server 1620 devices can include inputs from one or more optical cameras 1601 having depth sensors 1602. Parallel compute resources 1604 can decompose the video and depth data into point clouds 1605 and/or texture triangles 1606. Data to generate textured triangles 1606 can also be provided by pre-generated 3D models 1603 of a scene. The point clouds 1605 and/or textured triangles 1606 can be compressed for transmission to one or more client devices, which can locally render the content. In one embodiment, a variety of compression units 1607, 1608, using a variety of compression algorithms, can compress generated content for transmission over a delivery medium from the server 1620 to one or more client 1630 devices. Decompression circuitry 1609, 1610 on the client 1630 devices can decompress and decode incoming bitstreams into video/texture and geometry data. For example, decompression circuitry 1609 can decode compressed point cloud data and provide the decompressed point cloud data to a viewpoint interpolation circuitry 1611. The interpolated viewpoint data can be used to generate bitmap data 1613. The decompressed point cloud data can be provided to a geometry reconstruction circuitry 1612 to reconstruct geometry data for a scene. The reconstructed geometry data can be textured by decoded texture data (textured triangles 1614) to generate a 3D rendering 1616 for viewing by the client 1630.

Figure 17A:
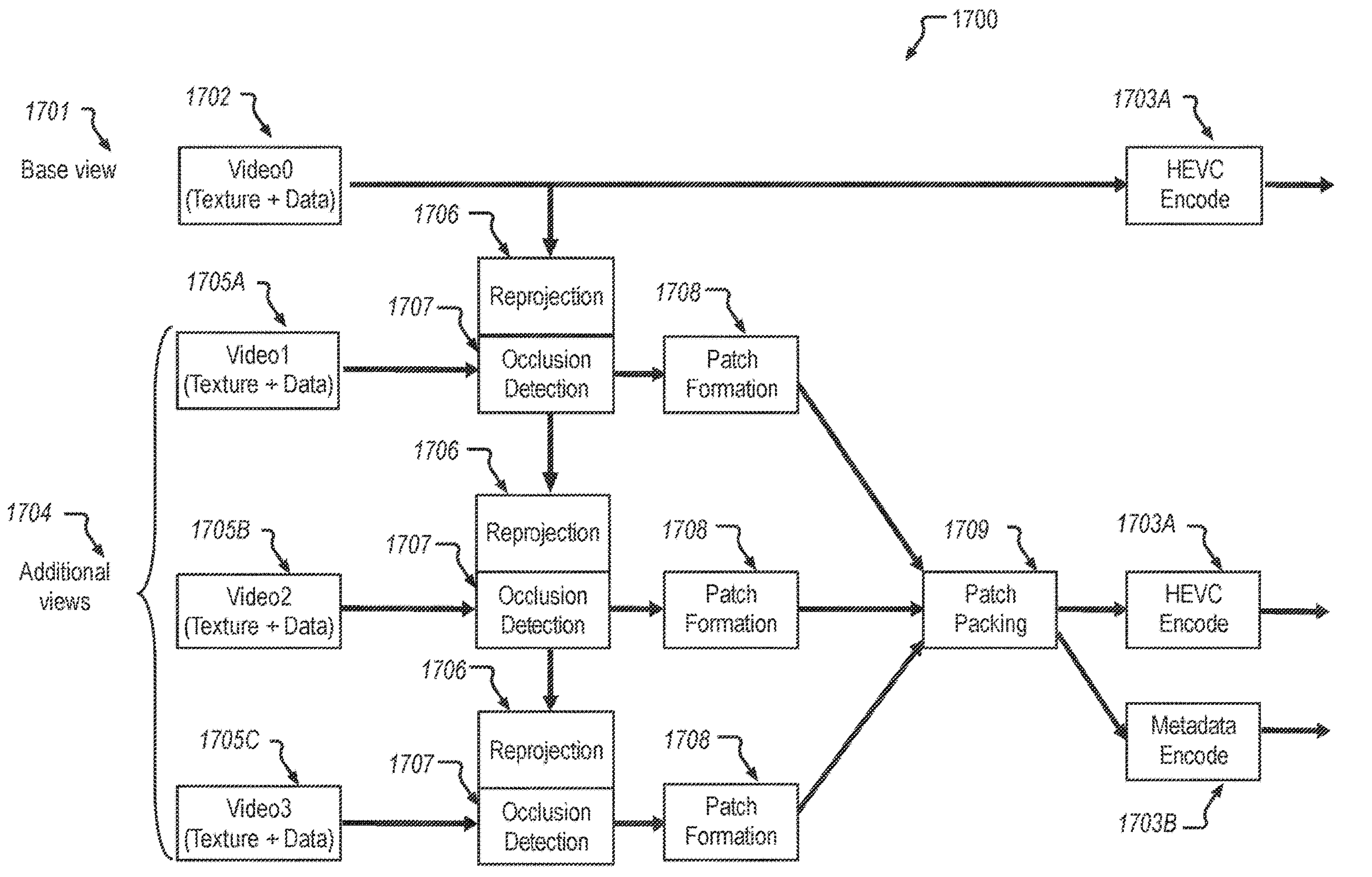
FIGS. 17A-17B illustrate a system for encoding and decoding Three Degrees of Freedom (3DoF) Plus content.
Figure 17B:
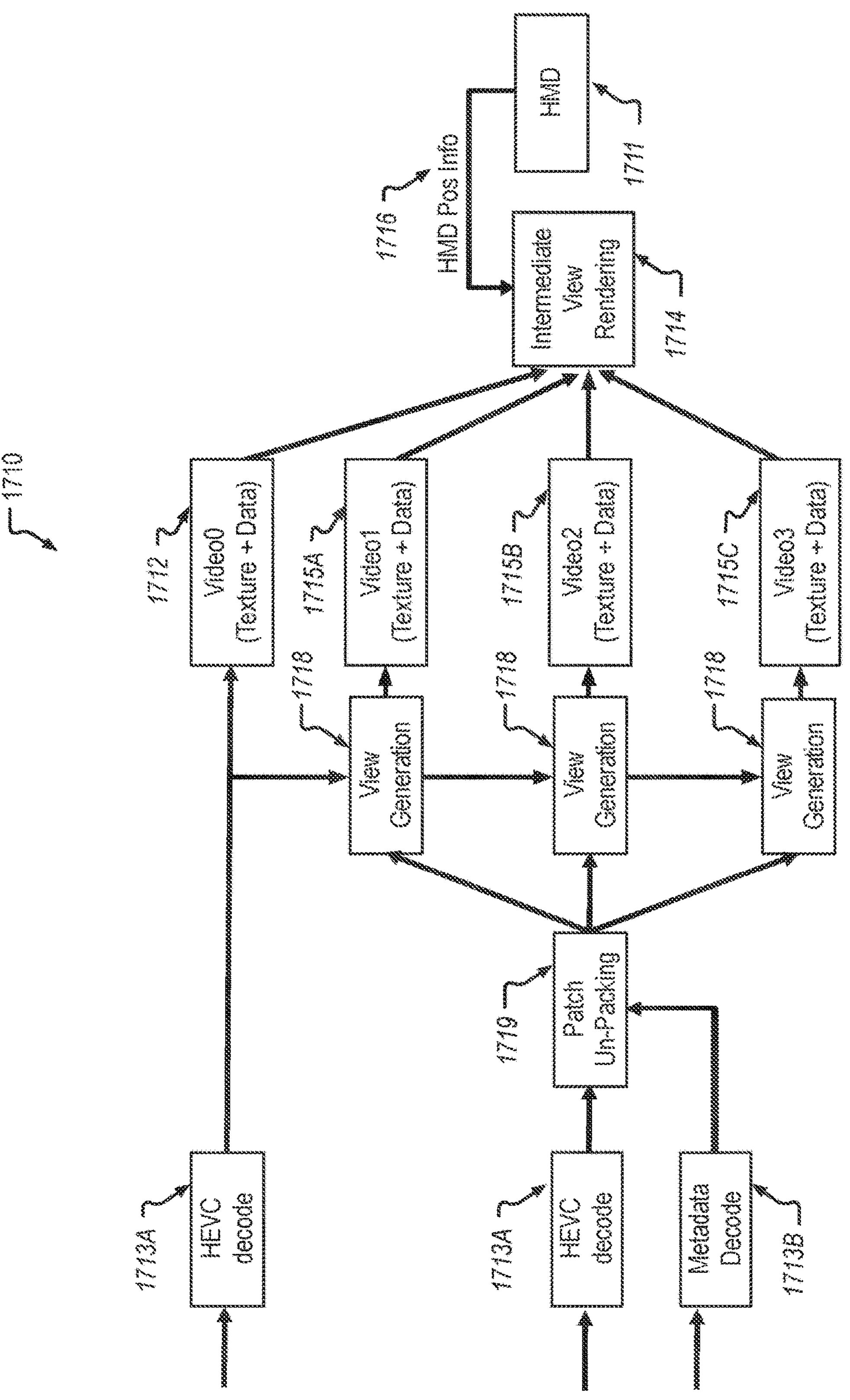

FIGS. 17A-17B illustrate a system 1700 for encoding and decoding 3DoF Plus content. The system 1700 can be implemented by hardware and software of a server 1620 infrastructure, for example, as in FIG. 16.

As shown in FIG. 17A, multiple cameras can be used to capture video data 1702 for a base view 1701 and video data 1705A-1705C for additional views 1704. Each camera can provide video data and depth data, where each frame of video data can be converted into a texture. A set of reprojection 1706 and occlusion detection 1707 circuitry can operate on received video data and output processed data to patch formation 1708 circuitry. Patches formed by the patch formation 1708 circuitry can be provided to a patch packing 1709 circuitry. Video data 1702 for the base view 1701 can be encoded, for example, via a high efficiency video coding (HEVC) encoder 1703A. A variant of the HEVC encoder 1703A can also be used to encode patch video data output from the patch packing 1709 circuitry. Metadata to reconstruct video from the encoded patches can be encoded by a metadata encode 1703B circuitry. Multiple encoded video and metadata streams can then be transmitted to a client device for viewing. At least one encoded video and metadata stream may include at least one added syntax element that has been added by an encoder. As discussed above, the added syntax element can be used by a decoder to determine if it is able to decode a bitstream and reconstruct the point cloud when the decoder has limited reconstruction capability.

As shown in FIG. 17B, multiple streams of video data can be received, decoded, and reconstructed into immersive video. The multiple streams of video include a stream for the base video, along with a stream containing packed data for the additional views. Encoded metadata is also received. The multiple video streams can be decoded, in one embodiment, via an HEVC 1713A decoder. Metadata can be decoded via a metadata 1713B decoder. The decoded metadata is then used to unpack the decoded additional views via patch un-packing 1719 logic. Decoded texture and depth data (video 0 1712, video 1-3 1714A-1715C) of the base view 1701 and the additional views 1704 are reconstructed by view generation logic 1718 on the client (e.g., client 1630 as in FIG. 16). The decoded video 1712, 1715A-1715C can be provided as texture and depth data to an intermediate view renderer 1714 that can be used to render intermediate views for a head mounted display 1711. Head mounted display position information 1716 is provided as feedback to the intermediate view renderer 1714, which can render updated views for the displayed viewport presented via the head mounted display 1711.

Figure 18A:
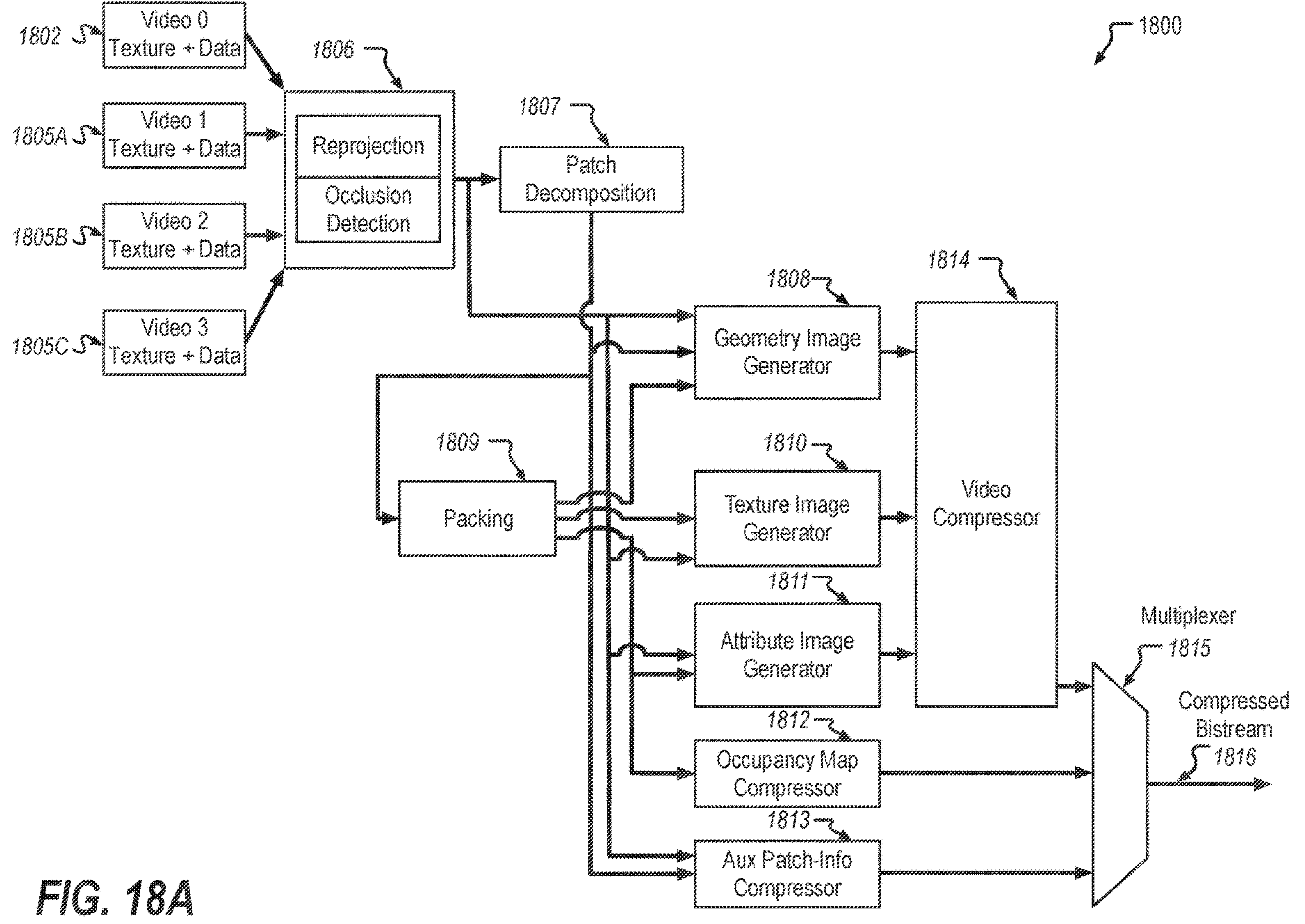
FIGS. 18A-18B illustrate a system for encoding and decoding Six Degrees of Freedom (6DoF) content using textured geometry data.
Figure 18B:
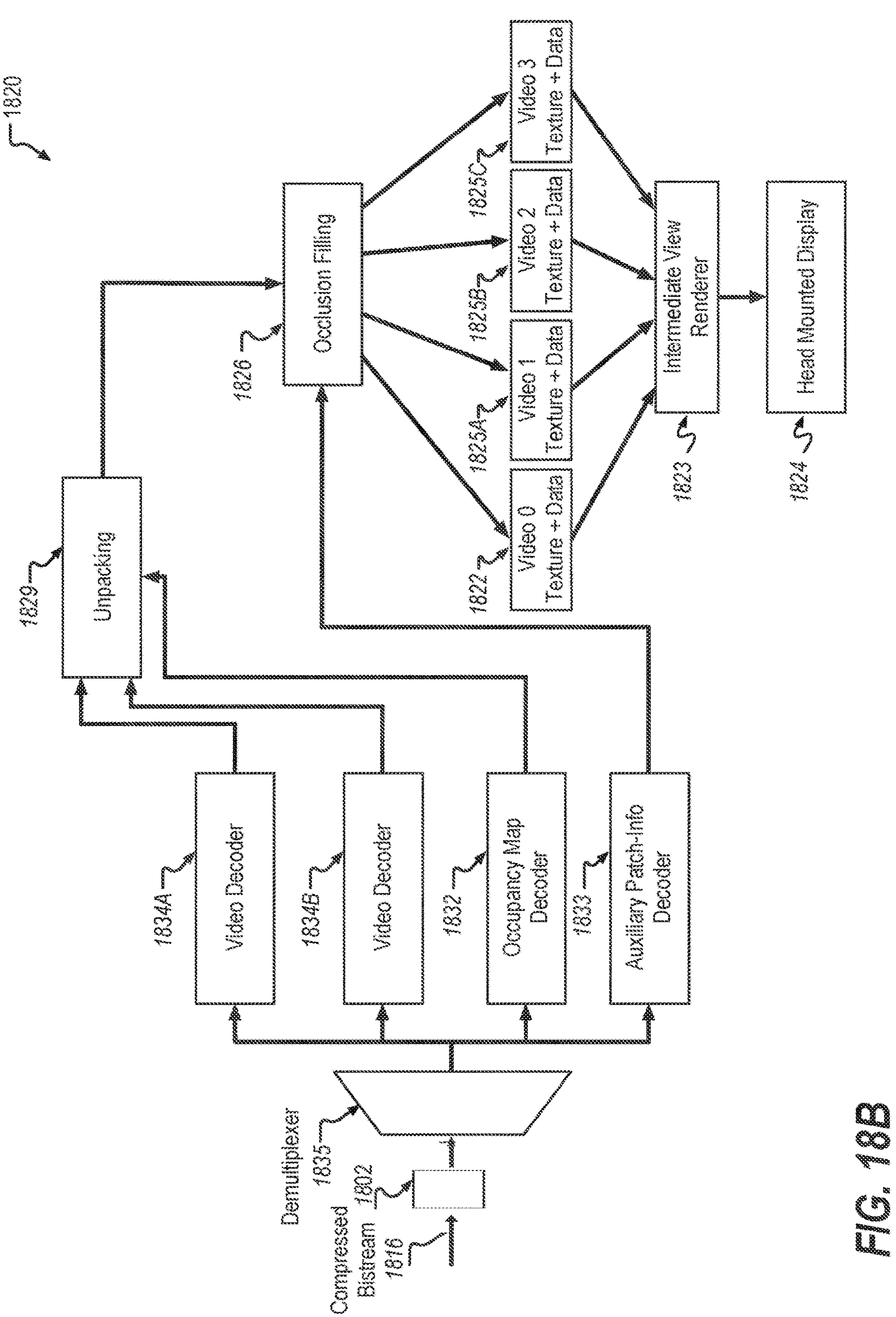

FIGS. 18A-18B illustrate a system for encoding and decoding 6DoF content using textured geometry data. FIG. 18A shows a 6DoF textured geometry encoding system 1800. FIG. 18B shows a 6DoF textured geometry decoding system 1820. 6DoF textured geometry encoding and decoding can be used to enable a variant of 6DoF immersive video in which video data is applied as a texture to geometry data, allowing new intermediate views to be rendered based on the position and orientation of a head mounted display. Data recorded by multiple video cameras can be combined with 3D models, particularly for static objects.

As shown in FIG. 18A, a 6DoF textured geometry encoding system 1800 can receive video data 1802 for a base view and video data 1805A-1805C for additional views. The video data 1802, 1805A-1805C includes texture and depth data that can be processed by a reprojection and occlusion detection circuitry 1806. Output from the reprojection and occlusion detection circuitry 1806 can be provided to a patch decomposition circuitry 1807 and a geometry image generator 1808. Output from the patch decomposition circuitry 1807 is provided to a patch packing circuitry 1809 and an auxiliary patch information compressor 1813. The auxiliary patch information (patch-info) provides information used to reconstruct patches of video texture and depth data. The patch packing circuitry 1809 outputs packed patch data to the geometry image generator 1808, a texture image generator 1810, an attribute image generator 1811, and an occupancy map compressor 1812.

The geometry image generator 1808, texture image generator 1810, and attribute image generator 1811 output data to a video compressor 1814. The geometry image generator 1808 can receive input from the reprojection and occlusion detection circuitry 1806, patch decomposition circuitry 1807, and patch packing circuitry 1809 and generates geometry image data. The texture image generator 1810 can receive packed patch data from the patch packing circuitry 1809 and video texture and depth data from the reprojection and occlusion detection circuitry 1806. The attribute image generator 1811 generates an attribute image from video texture and depth data received from the reprojection and occlusion detection circuitry 1806 and patched patch data received from the patch packing circuitry 1809.

An occupancy map can be generated by an occupancy map compressor 1812 based on packed patch data output from the patch packing circuitry 1809. Auxiliary patch information can be generated by the auxiliary patch information compressor 1813. Compressed occupancy map and auxiliary patch information data can be multiplexed into a compressed bitstream 1816 by a multiplexer 1815 along with compressed and/or encoded video data output from the video compressor 1814. The compressed video data output from the video compressor 1814 includes compressed geometry image data, texture image data, and attribute image data. The compressed bitstream 1816 can be stored or provided to a client device for decompression and viewing.

As shown in FIG. 18B, a 6DoF textured geometry decoding system 1820 can be used to decode 6DoF content generated using the encoding system 1800 of FIG. 18A. The compressed bitstream 1816 is received and demultiplexed by a demultiplexer 1835 into multiple video decode streams, an occupancy map, and auxiliary patch information. In another example, the bitstream 1816 is received by an optional network element 1802 that determines whether the client is capable of decoding and reconstructing a point cloud. If not, then no decoding occurs by the decoding system 1820. The multiple video streams are decoded/decompressed by video decoders 1834A-1834B. Occupancy map data is decoded/decompressed by an occupancy map decoder 1832. The decoded video data and occupancy map data are output by the video decoders 1834A-1834B and the occupancy map decoder 1832 to an unpacking circuitry 1829. The unpacking circuitry unpacks video patch data that is packed by the patch packing circuitry 1809 of FIG. 18A. Auxiliary patch information from the auxiliary patch-info decoder 1833 is provided to an occlusion filling circuitry 1826, which can be used to fill in patches from occluded portions of an object that may be missing from a particular view of the video data. Respective video streams 1822, 1825A-1825C having texture and depth data are output from the occlusion filling circuitry 1826 and provided to an intermediate view renderer 1823, which can render a view for display on a head mounted display 1824 based on position and orientation information provided by the head mounted display 1824.

Figure 19A:
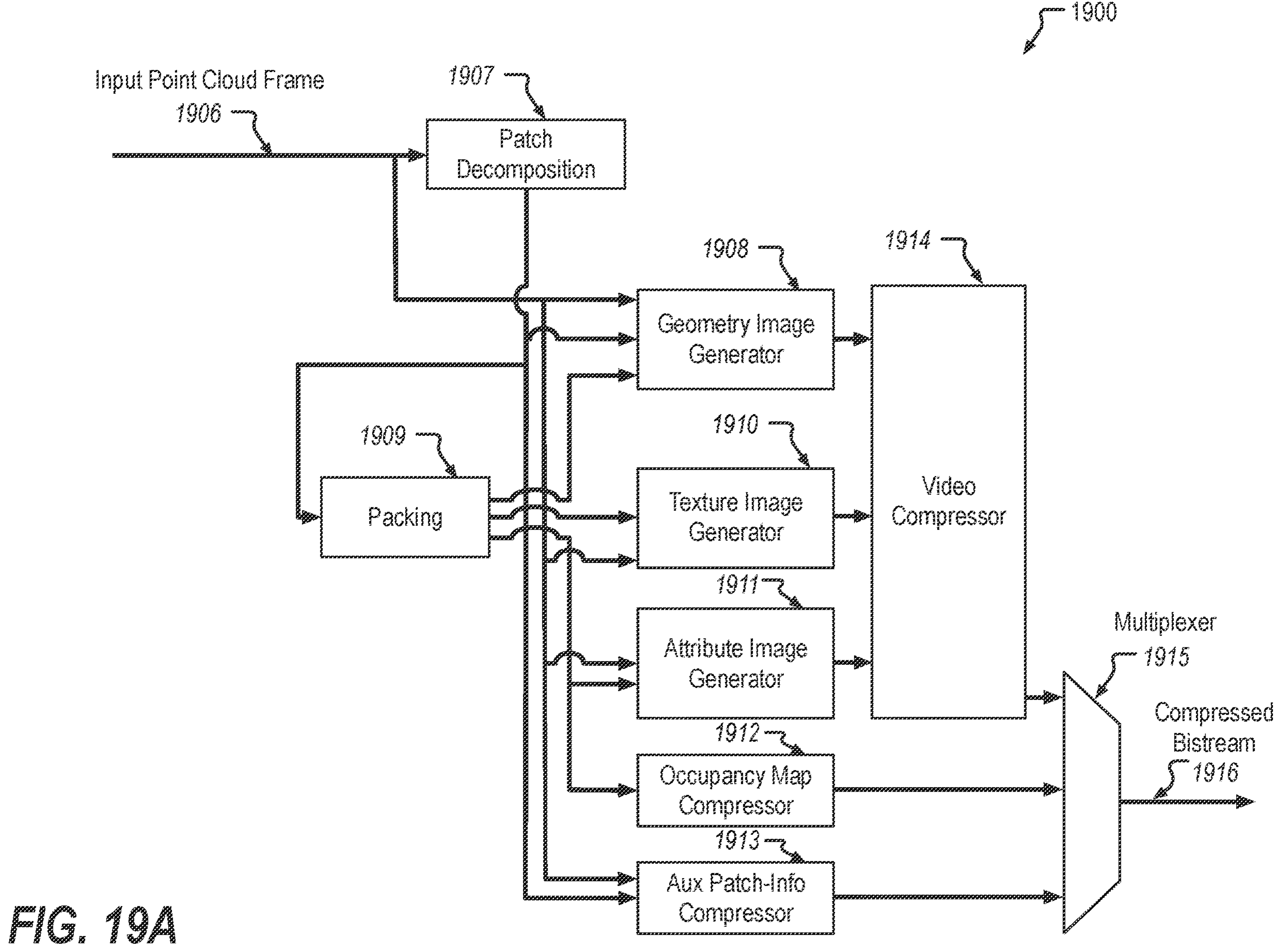
FIGS. 19A-19B illustrate a system for encoding and decoding 6DoF content via point cloud data.
Figure 19B:
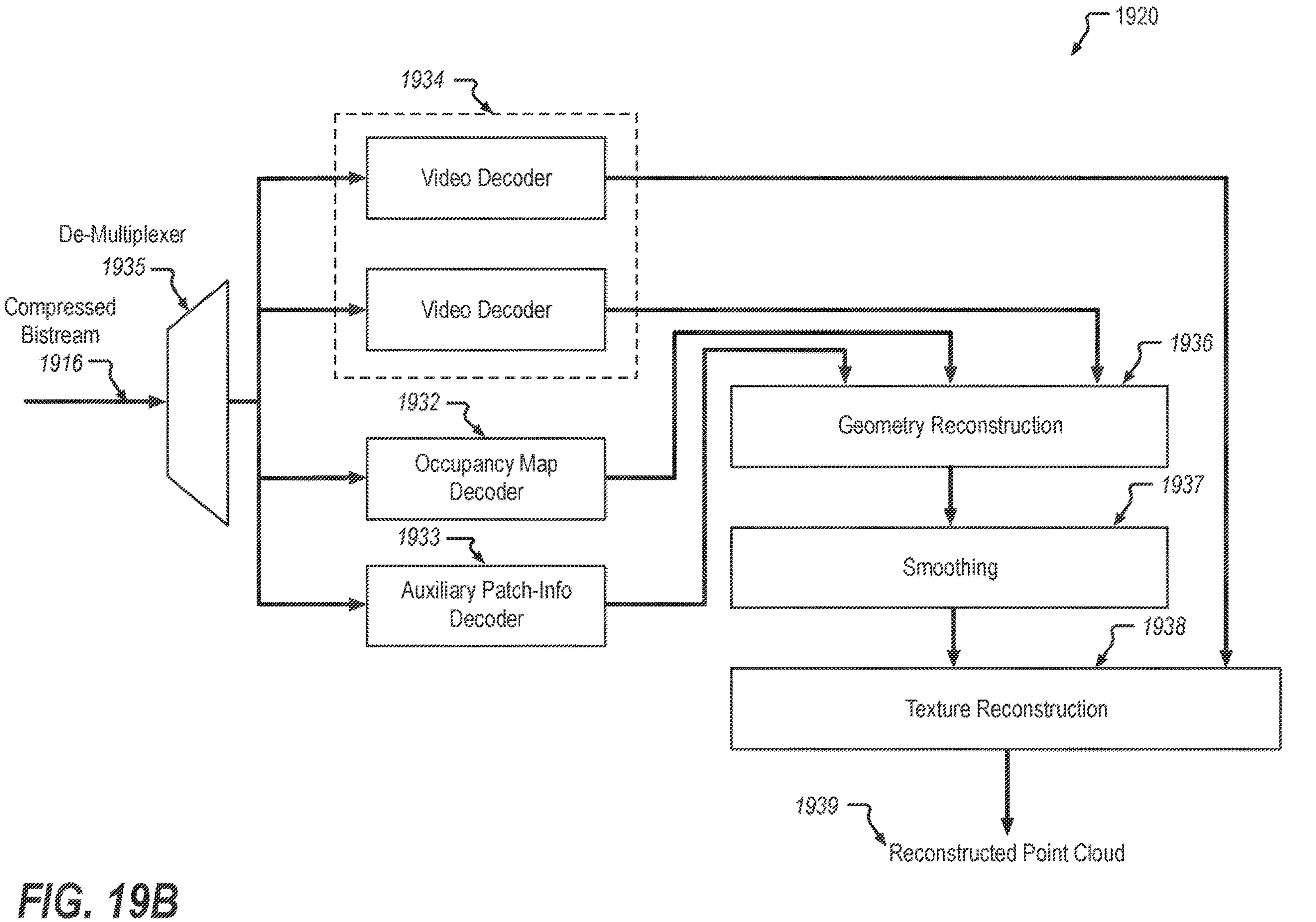

FIGS. 19A-19B illustrate a system for encoding and decoding 6DoF content via point cloud data. FIG. 19A illustrates a 6DoF point cloud encoding system 1900. FIG. 19B illustrates a 6DoF point cloud decoding system 1920.

As shown in FIG. 19A, an input frame of point cloud data can be decomposed into patch data. The point cloud data and decomposed patch data can be encoded in a similar manner as video texture and depth data in FIG. 18A. Input data including a point cloud frame 1906 can be provided to a patch decomposition circuitry 1907. The input point cloud data and decomposed patches thereof can be processed by a packing circuitry 1909, geometry image generator 1908, texture image generator 1910, attribute image generator 1911, occupancy map compressor 1912, and auxiliary patch information compressor 1913 using techniques similar to the processing of texture depth and video data output by the reprojection and occlusion detection circuitry 1806 and patch decomposition circuitry 1807 of FIG. 18A. A video compressor 1914 can encode and/or compress geometry image, texture image, and attribute image data. The compressed and/or encoded video data from the video compressor 1914 can be multiplexed by a multiplexer 1915 with occupancy map and auxiliary patch information data into a compressed bitstream 1916, which can be stored or transmitted for display.

The compressed bitstream output by the system 1900 of FIG. 19A can be decoded by the point cloud decoding system 1920 shown in FIG. 19B. As shown in FIG. 19B, a compressed bitstream 1916 can be demultiplexed into multiple encoded/compressed video streams, occupancy map data, and auxiliary patch information. The video streams can be decoded/decompressed by a multi-stream video decoder 1934, which can output texture and geometry data. Occupancy map and auxiliary patch information can be decompressed/decoded by an occupancy map decoder 1932 and an auxiliary patch information decoder 1933.

Geometry reconstruction, smoothing, and texture reconstruction can then be performed to reconstruct the point cloud data provided to the 6DoF point cloud encoding system 1900 of FIG. 19A. A geometry reconstruction circuitry 1936 can reconstruct geometry information based on geometry data decoded from a video stream of the multi-stream video decoder 1934, as well as output of the occupancy map decoder 1932 and auxiliary patch information decoder 1933. Reconstructed geometry data can be smoothed by a smoothing circuitry 1937. Smoothed geometry and texture image data decoded from a video stream output by the multi-stream video decoder 1934 is provided to a texture reconstruction circuitry 1938. The texture reconstruction circuitry 1938 can output a reconstructed point cloud 1939, which is a variant of the input point cloud frame 1926 provided to the 6DoF point cloud encoding system 1900 of FIG. 19A.

FIG. 20 illustrates a computing device 2000 hosting PCC standard definition mechanism ("definition mechanism") 2010 according to one embodiment. Computing device 2000 represents a communication and data processing device including (but not limited to) smart wearable devices, smartphones, virtual reality (VR) devices, head-mounted display (HMDs), mobile computers, Internet of Things (IoT) devices, laptop computers, desktop computers, server computers, etc., and be similar to or the same as processing device 100 of FIG. 1; accordingly, for brevity, clarity, and ease of understanding, many of the details stated above with reference to FIGS. 1-19B are not further discussed or repeated hereafter. In one embodiment, definition mechanism 2010 provides for defining interoperability signaling and conformance points for the PCC standard. For example, defining mechanism 2010 may include one or more components to define interoperability signaling and conformance points to enable the ecosystem specification of PCC products to allow for flexible video decode and GPU capability, as described earlier in this document.

Computing device 2000 may further include (without limitations) an autonomous machine or an artificially intelligent agent, such as a mechanical agent or machine, an electronics agent or machine, a virtual agent or machine, an electro-mechanical agent or machine, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Throughout this document, "computing device" may be interchangeably referred to as "autonomous machine" or "artificially intelligent agent" or simply "robot".

It contemplated that although "autonomous vehicle" and "autonomous driving" are referenced throughout this document, embodiments are not limited as such. For example, "autonomous vehicle" is not limited to an automobile but that it may include any number and type of autonomous machines, such as robots, autonomous equipment, household autonomous devices, and/or the like, and any one or more tasks or operations relating to such autonomous machines may be interchangeably referenced with autonomous driving.

Computing device 2000 may further include (without limitations) large computing systems, such as server computers, desktop computers, etc., and may further include set-top boxes (e.g., Internet-based cable television set-top boxes, etc.), global positioning system (GPS)-based devices, etc. Computing device 2000 may include mobile computing devices serving as communication devices, such as cellular phones including smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, computing device 2100 may include a mobile computing device employing a computer platform hosting an integrated circuit ("IC"), such as system on a chip ("SoC" or "SOC"), integrating various hardware and/or software components of computing device 2000 on a single chip.

As illustrated, in one embodiment, computing device 2000 may include any number and type of hardware and/or software components, such as (without limitation) parser 2020 (e.g., syntax element parser), graphics processing unit ("GPU" or simply "graphics processor") 2014, graphics driver (also referred to as "GPU driver", "graphics driver logic", "driver logic", user-mode driver (UMD), UMD, user-mode driver framework (UMDF), UMDF, or simply "driver") 2016, central processing unit ("CPU" or simply "application processor") 2012, memory 2008, network devices, drivers, or the like, as well as input/output (I/O) sources 2004, such as touchscreens, touch panels, touch pads, virtual or regular keyboards, virtual or regular mice, ports, connectors, etc. Computing device 2000 may include operating system (OS) 2006 serving as an interface between hardware and/or physical resources of the computer device 2000 and a user. It is contemplated that graphics processing unit 2014 (or graphics processor 2014) and CPU 2012 (or application processor 2012) may be one or more of processor(s) 102 of FIG. 1.

It is to be appreciated that a lesser or more equipped system than the example described above may be preferred for certain implementations. Therefore, the configuration of computing device 2000 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", "mechanism", "tool", "circuit", and "circuitry" are referenced interchangeably throughout this document and include, by way of example, software, hardware, firmware, or any combination thereof.

In one embodiment, as illustrated, definition mechanism 2010 may be hosted by memory 2008 of computing device 2000. In another embodiment, definition mechanism 2010 may be hosted by operating system 2006 or graphics driver 2016. In yet another embodiment, definition mechanism 2010 may be hosted by or part of graphics processing unit ("GPU" or simply graphics processor") 2014 or firmware of graphics processor 2014. For example, definition mechanism 2010 may be embedded in or implemented as part of the processing hardware of graphics processor 2014. Similarly, in yet another embodiment, definition mechanism 2010 may be hosted by or part of central processing unit ("CPU" or simply "application processor") 2012. For example, definition mechanism 2010 may be embedded in or implemented as part of the processing hardware of application processor 2012. The parser 2020 may be hosted by or part of any number or type of components of computing device, such as definition mechanism 2010 or OS 2006.

In yet another embodiment, definition mechanism 2010 may be hosted by or part of any number and type of components of computing device 2000, such as a portion of definition mechanism 2010 may be hosted by or part of operating system 2006, another portion may be hosted by or part of graphics processor 2014, another portion may be hosted by or part of application processor 2012, while one or more portions of definition mechanism 2010 may be hosted by or part of operating system 2006 and/or any number and type of devices of computing device 2000. It is contemplated that embodiments are not limited to any implementation or hosting of definition mechanism 2010 and that one or more portions or components of definition mechanism 2010 may be employed or implemented as hardware, software, or any combination thereof, such as firmware.

Computing device 2000 may host network interface(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), $4^{th}$ Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

FIG. 21 illustrates a computer implemented method 2100 having an exemplary sequence of operations for a PCC standard definition mechanism in accordance with one embodiment. The PCC standard definition mechanism (e.g., mechanism 2010) can be implemented in a computing device as illustrated in FIG. 20. As discussed above, definition mechanism 2010 may be hosted by or part of any number and type of components of computing device 2000.

At operation 2102, the method 2100 includes decoding a compressed bitstream of patch video data representing a point cloud. At operation 2104, the method includes reconstructing, with point cloud reconstructor circuitry, a point cloud from the decoded patch video data. At operation 2106, the method includes receiving, with a syntax element parser (e.g., 2020), at least one syntax element representing interoperability signaling in the compressed bitstream to indicate the number of points in one or more pictures of the patch video data. At operation 2108, the method includes determining, with processing hardware, if the number of points in the one or more pictures of the compressed bitstream is within the conformance limits of the point cloud reconstructor circuitry.

The at least one syntax element may be included in a High Level Syntax including a Supplemental Enhancement Information message, parameters set, or picture header of the PCC bitstream. The at least one syntax element may indicate a performance level needed to decode the compressed PCC bitstream with the performance level including a maximum picture size and pixel rate.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Some embodiments pertain to Example 1 that includes a computing device comprising a decoder to decode a compressed bitstream of patch video data representing a point cloud, point cloud reconstructor circuitry to reconstruct a point cloud from the decoded patch video data, a syntax element parser to receive at least one syntax element representing interoperability signaling in the compressed bitstream to indicate the number of points in one or more pictures of the patch video data, and processing hardware to determine if the number of points in the one or more pictures of the compressed bitstream is within the conformance limits of the point cloud reconstructor circuitry.

Example 2 includes the subject matter of Example 1, wherein the at least one syntax element to indicate a reconstruction level that indicates for each coded picture a number of points to be created by the point cloud reconstructor circuitry.

Example 3 includes the subject matter of any of Examples 1-2, wherein the decoder comprises at least one video decoder to decode video data and a metadata decoder to decode metadata.

Example 4 includes the subject matter of any of Examples 1-3, wherein the video decode capability of the decoder is decoupled from point cloud reconstructing capability of the point cloud reconstructor circuitry.

Example 5 includes the subject matter of any of Examples 1-4, wherein the at least one syntax element is included in a High Level Syntax including a Supplemental Enhancement Information message, parameters set, or picture header of the bitstream.

Example 6 includes the subject matter of any of Examples 1-5, wherein the at least one syntax element to indicate a performance level needed to decode the compressed bitstream with the performance level including a maximum picture size and pixel rate.

Example 7 includes the subject matter of any of Examples 1-6, wherein the processing hardware comprises a graphics processor co-located and in communication with an application processor.

Example 8 includes the subject matter of any of Examples 1-7, wherein the application processor or a network element to determine if the compressed bitstream is decodable based on the at least one syntax element.

Some embodiments pertain to Example 9 that includes a computer implemented method comprising decoding a compressed bitstream of patch video data representing a point cloud, reconstructing, with point cloud reconstructor circuitry, a point cloud from the decoded patch video data, receiving at least one syntax element representing interoperability signaling in the compressed bitstream to indicate the number of points in one or more pictures of the patch video data, and determining, with processing hardware, if the number of points in the one or more pictures of the compressed bitstream is within the conformance limits of the point cloud reconstructor circuitry.

Example 10 includes the subject matter of Example 9, wherein the at least one syntax element to indicate a reconstruction level that indicates for each coded picture a number of points to be created by the point cloud reconstructor circuitry.

Example 11 includes the subject matter of any of Examples 9-10, wherein the profile level comprises a client reconstruct level definition with client reconstruct level 1 being able to create 100% of points, at matching positions; client reconstruct level 2 being able to create at least 75% of points; and client reconstruct level 3 being able to create at least 50% of points.

Example 12 includes the subject matter of any of Examples 9-11, further comprising decompressing the compressed bitstream.

Example 13 includes the subject matter of any of Examples 9-12, wherein a decode capability of a decoder and a point cloud reconstructing capability of the point cloud reconstructor circuitry are decoupled with the at least one syntax element indicating a first level for video decode capability and a second level for point cloud reconstructing capability.

Example 14 includes the subject matter of any of Examples 9-13, wherein the at least one syntax element is included in a High Level Syntax including a Supplemental Enhancement Information message, parameters set, or picture header of the bitstream.

Example 15 includes the subject matter of any of Examples 9-14, wherein the at least one syntax element to indicate a performance level needed to decode the compressed bitstream with the performance level including a maximum picture size and pixel rate.

Example 16 includes the subject matter of any of Examples 9-12, wherein at least one operation of the method is performed by the processing hardware comprising a graphics processor co-located and in communication with an application processor.

Some embodiments pertain to Example 17 that includes a server device comprising compute resources to process video data representing a point cloud and an encoder to add at least one syntax element representing interoperability signaling in a bitstream of the video data to indicate a number of points in one or more pictures of the video data.

Example 18 includes the subject matter of Example 17, wherein the at least one syntax element to indicate a performance level needed to decode the bitstream.

Example 19 includes the subject matter of any of Examples 17-18, wherein the encoder to encode video data and to encode metadata for multiple encoded video and metadata streams to be transmitted to a client device for viewing.

Example 20 includes the subject matter of any of Examples 17-19, wherein the at least one syntax element is included in a High Level Syntax including a Supplemental Enhancement Information message, parameters set, or picture header of the bitstream.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. At least one memory comprising instructions to cause at least one processor circuit to at least:

project point cloud data of a frame of an immersive video onto a plurality of planes associated respectively with a plurality of projection angles to determine a plurality of projected images;

encode the projected images in a bitstream; and encode a syntax element in the bitstream, the syntax element to specify conformance information associated with reconstruction of the point cloud data from the bitstream, the conformance information based on a number of points to be created by the reconstruction of the point cloud data for the frame of the immersive video.

2. The at least one memory of claim 1, wherein the conformance information is associated with a conformance point.

3. The at least one memory of claim 1, wherein the syntax element is associated with at least one of a profile or a level.

4. The at least one memory of claim 1, wherein the syntax element is a first syntax element, and the instructions are to cause one or more of the at least one processor circuit to encode a second syntax element in the bitstream, the first syntax element associated with a profile, the second syntax element associated with a level.

5. The at least one memory of claim 1, wherein the instructions are to cause one or more of the at least one processor circuit to encode the syntax element in a message.

6. The at least one memory of claim 5, wherein the message is a supplemental enhancement information message.

7. The at least one memory of claim 1, wherein the point cloud data includes a plurality of points, respective ones of the points having a respective location, a respective color attribute and a respective reflectance attribute.

8. An apparatus comprising:

memory;

instructions; and at least one processor circuit to be programmed by the instructions to:

project point cloud data of a frame of an immersive video onto a plurality of planes associated respectively with a plurality of projection angles to determine a plurality of projected images;

encode the projected images in a bitstream; and encode a syntax element in the bitstream, the syntax element to specify conformance information associated with reconstruction of the point cloud data from the bitstream, the conformance information based on a number of points to be created by the reconstruction of the point cloud data for the frame of the immersive video.

9. The apparatus of claim 8, wherein the conformance information is associated with a conformance point.

10. The apparatus of claim 8, wherein the syntax element is associated with at least one of a profile or a level.

11. The apparatus of claim 8, wherein the syntax element is a first syntax element, and one or more of the at least one processor circuit is to encode a second syntax element in the bitstream, the first syntax element associated with a profile, the second syntax element associated with a level.

12. The apparatus of claim 8, wherein one or more of the at least one processor circuit is to encode the syntax element in a message.

13. The apparatus of claim 12, wherein the message is a supplemental enhancement information message.

14. The apparatus of claim 8, wherein the point cloud data includes a point, the point having a location, a color attribute and a reflectance attribute.

15. A system comprising:

memory;

instructions;

at least one processor circuit to be programmed based on the instructions to:

project point cloud data of a frame of an immersive video onto a plurality of planes associated respectively with a plurality of projection angles to determine a plurality of projected images;

encode the projected images in a bitstream; and encode a syntax element in the bitstream, the syntax element to specify conformance information associated with reconstruction of the point cloud data from the bitstream, the conformance information based on a number of points to be created by the reconstruction of the point cloud data for the frame of the immersive video; and network interface circuitry to transmit the bitstream.

16. The system of claim 15, wherein the conformance information is associated with a conformance point.

17. The system of claim 15, wherein the syntax element is a first syntax element, and one or more of the at least one processor circuit is to encode a second syntax element in the bitstream, the first syntax element associated with a profile, the second syntax element associated with a level.

18. The system of claim 15, wherein one or more of the at least one processor circuit is to encode the syntax element in a message.

19. The system of claim 18, wherein the message is a supplemental enhancement information message.

20. The system of claim 15, wherein the point cloud data includes a plurality of points, respective ones of the points having a respective location, a respective color attribute and a respective reflectance attribute.

* * * * *